(12) United States Patent
Bilge

(10) Patent No.: US 10,893,647 B1
(45) Date of Patent: Jan. 19, 2021

(54) ECOLOGICALLY GREEN FACADE FOR A BUILDING WALL

(71) Applicant: Henry H. Bilge, Fort Lee, NJ (US)

(72) Inventor: Henry H. Bilge, Fort Lee, NJ (US)

( * ) Notice: Subject to any disclaimer, the term of this patent is extended or adjusted under 35 U.S.C. 154(b) by 643 days.

(21) Appl. No.: 15/493,939

(22) Filed: Apr. 21, 2017

(51) Int. Cl.
*A01G 9/02* (2018.01)
*A01G 27/00* (2006.01)
*E04B 2/88* (2006.01)
*E04D 13/04* (2006.01)

(52) U.S. Cl.
CPC ............. *A01G 9/025* (2013.01); *A01G 9/023* (2013.01); *A01G 9/027* (2013.01); *A01G 27/005* (2013.01); *E04B 2/88* (2013.01); *E04D 13/0404* (2013.01); *E04D 13/0445* (2013.01); *E04D 2013/0495* (2013.01)

(58) Field of Classification Search
CPC ........ A01G 9/025; A01G 9/023; A01G 9/027; A01G 27/005; A01G 27/04; A01G 27/02; A01G 27/06; A01G 9/022; A01G 9/0295; A01G 9/0297; A01G 9/02; A01G 31/06; A01G 9/1476; Y02P 60/244; E04D 13/064
USPC ....... 47/65.7, 59 R, 65.9, 86, 87, 66.1, 66.5, 47/65.5, 82, 83, 62 R, 62 A, 62 E, 62 N, 47/63, 67, 66.6
See application file for complete search history.

(56) References Cited

U.S. PATENT DOCUMENTS

| | | | | |
|---|---|---|---|---|
| 4,295,296 A | * | 10/1981 | Kinghorn | ............... A01G 9/025 47/82 |
| 5,373,662 A | * | 12/1994 | Wickstrom | ............ A01G 9/022 47/65.9 |
| 5,842,308 A | * | 12/1998 | Turner | ................. A01G 27/005 47/48.5 |
| 9,462,755 B1 | * | 10/2016 | Coraggio | ............... A01G 9/025 |
| 10,485,185 B1 | * | 11/2019 | Di Prima-Bucci | .... A01G 9/025 |
| 2008/0295402 A1 | * | 12/2008 | Bindschedler | ......... A01G 9/025 47/83 |
| 2010/0146855 A1 | * | 6/2010 | Ma | ........................ A01G 9/025 47/82 |
| 2011/0094153 A1 | * | 4/2011 | Urriola | ................... A01G 9/025 47/65.7 |
| 2011/0107667 A1 | * | 5/2011 | Laurence | ............... A01G 9/025 47/59 S |
| 2011/0252704 A1 | * | 10/2011 | Cho | ........................ A01G 9/025 47/66.6 |
| 2011/0258925 A1 | * | 10/2011 | Baker | .................... A01G 9/023 47/65.8 |
| 2012/0222352 A1 | * | 9/2012 | Janssen | .................. A01G 9/025 47/65.7 |

(Continued)

*Primary Examiner* — Trinh T Nguyen

(74) *Attorney, Agent, or Firm* — Joshua Kaplan, Esq.; Kaplan Law Practice, LLC

(57) ABSTRACT

An ecologically green unit to be mounted on an existing wall, includes a base frame; a securing arrangement for securing the base frame as a façade to a front face of an existing wall of a building; a plant root securing mat for securing roots of plants in the base frame; a plant guide formed of a mesh of wires at a front of the base frame for orienting and maintaining the plants in a desired orientation; a water supplying arrangement for supplying water to the plants in the base frame, the water supplying arrangement including at least one capillary member for wicking water to different areas within the base frame and an arrangement for collecting and supplying rain water to the base frame; and an arrangement for directing sunlight to an interior of the base frame.

32 Claims, 20 Drawing Sheets

(56) References Cited

U.S. PATENT DOCUMENTS

2013/0160363 A1* 6/2013 Whitney ............... A01G 9/025
  47/59 S
2016/0212953 A1* 7/2016 Janssen ................ A01G 27/02

* cited by examiner

ECOLOGICALLY GREEN FACADE FOR A BUILDING WALL

BACKGROUND OF THE INVENTION

The present invention relates generally to a wall system, and more particularly, to a system for presenting an ecologically green façade for a building wall.

In order to enhance the look of a wall of a building, it is known to secure wall panels to the wall. Although such wall panels provide an enhanced aesthetic appearance, there is an inclination today to provide ecologically green building structures, and particularly, buildings which display an ecologically green environment.

However, unlike conventional wall panels which are secured to existing walls of a building by screws or other fastening devices, the securement of plants and the like to a building wall is not readily attainable.

Still further, even if plants and the like could be mounted to a wall of a building, there would still be problems of orienting the plants, watering the plants, accounting for water drainage and the like.

It would therefore be desirable to provide an ecologically green façade comprised of plants mounted to a wall of a building.

SUMMARY OF THE INVENTION

Accordingly, it is an object of the present invention to provide an ecologically green façade comprised of plants mounted to a wall of a building, that overcomes the aforementioned problems.

It is another object of the present invention to provide an ecologically green façade comprised of plants mounted to a wall of a building, with an arrangement for holding and orienting the plants in a desired orientation and position.

It is still another object of the present invention to provide an ecologically green façade comprised of plants mounted to a wall of a building along with a watering system therefor.

It is yet another object of the present invention to provide an ecologically green façade comprised of plants mounted to a wall of a building which ecologically utilizes rainwater to water the plants.

It is a further object of the present invention to provide an ecologically green façade comprised of plants mounted to a wall of a building which provides drainage of any water used to water the plants.

In accordance with an aspect of the present invention, an ecologically green unit to be mounted on an existing wall, includes a base frame; a securing arrangement for securing the base frame as a façade to a front face of an existing wall of a building; a plant root securing arrangement for securing roots of plants in the base frame; a plant guide for orienting and maintaining the plants in a desired orientation; and a water supplying arrangement for supplying water to the plants in the base frame.

The plant root securing arrangement includes a mat positioned within the base frame, and the plant guide includes a mesh arrangement at a front portion of the base frame through which the plants extend. The mesh arrangement is comprised of a plurality of wires, each separately and individually extended along a front portion of base frame in different directions.

The water supplying arrangement includes at least one capillary member for wicking water to different areas within the base frame.

Preferably, the base frame includes a water reservoir area at a lower end thereof; and the at least one capillary member includes a capillary mat for wicking water from the water reservoir area to an upper end of the base frame. In addition, the base frame includes at least one wall defining the water reservoir area, and at least one opening in the at least one wall for draining water from the water reservoir area when the water in the water reservoir area reaches a predetermined level, with the capillary mat being in contact with water in the water reservoir.

The at least one capillary member further includes a plurality of capillary tubes arranged in a mesh arrangement in a plurality of layers, with the capillary tubes in each layer being in spaced apart relation and the capillary tubes in different layers extending in different directions so as to create spaces between the capillary tubes for receiving soil for plant growth. Each capillary tube is at least partially surrounded and is supported by a protective sheath.

The base frame includes a water reservoir area at a lower end thereof, and further includes a porous sheet below the capillary tubes to prevent soil from entering the water reservoir area, while permitting water and air to pass through the porous sheet.

There is also an undulating barrier wall in the base frame, the barrier wall having openings for permitting passage of air and water therethrough, while preventing passage of soil therethrough.

The water supplying arrangement includes at least one opening in the base frame for receiving water therein. Preferably, the water supplying arrangement includes a rain water collecting arrangement for collecting rain water and supplying the rain water through the at least one opening in the base frame.

In one embodiment, the water supplying arrangement includes a wall positioned above the ecologically green unit, the wall including an opening for supplying water to the ecologically green unit by gravity, a ramp at an upper portion of the existing wall for collecting and directing a flow of rain water to the opening in the wall, and a flow director associated with the opening in the wall for directing the rain water from the opening to the ecologically green unit. Preferably, the flow director includes a flap hinged to the wall immediately above the opening therein and in covering relation to the opening. The water supplying arrangement further includes a valve associated with the ramp for controlling water flow to the opening in the wall. In addition, coping is positioned above the wall and is inclined downwardly toward the wall, the coping including at least one opening so that any rain water that falls on the coping drains through the at least one opening therein onto the ramp.

There is also an arrangement for directing sunlight to an interior of the base frame. The sunlight directing arrangement includes at least one tube mounted in the base frame and extending out through a front of the base frame, each tube including a transparent front end through which sunlight is adapted to enter and a transparent rear end through which the sunlight is emitted to the plants in the base frame. Also, each tube is hollow and has at least one opening in a front end thereof by which rain water is received and transported to an interior of the base frame. Each tube further includes a channel at a lower portion thereof to deliver vitamins and nutrients to the plants.

The water supplying arrangement can further include at least one water supplying tube for supplying water to an interior of the base frame. A control controls at least one of flow amount and flow times of water through the at least one water supplying tube. A lower drain area is provided below the ecologically green unit for collecting water drained from the ecologically green unit and for providing the water in the lower drain area for use by the water supplying tube.

A lighting arrangement is associated with the ecologically green unit for illuminating the plants therein.

Preferably, the base frame has a front wall that slopes outwardly and downwardly away from the existing wall. There is also a cover frame in partial covering relation to the base frame, the cover frame having a front wall that slopes outwardly and downwardly away from the existing wall.

In one embodiment, the securing arrangement includes at least one bracket member mounted to either the existing wall or a connecting panel connected to the existing wall; and at least one hook member mounted to each base frame, with each hook member adapted to engage one bracket member for mounting the base frame to either the existing wall or the connecting panel. There is further an adjustment arrangement for adjusting a position of each hook member relative to a respective the bracket member on which the hook member is mounted.

In another embodiment, the securing arrangement includes a first securing member adapted to be secured to the existing wall; a second securing member adapted to be secured to the base frame; and the second securing member is removably connected with the first securing member. In such case, the base frame is connected directly or indirectly to the first securing member, and a cover frame is in at least partial covering relation to the base frame, the cover frame being connected to the second securing member. The second securing member includes parallel, spaced apart walls, and the cover frame is retained between said parallel, spaced apart walls. The cover frame is retained between the parallel, spaced apart walls by at least one of the following: screws and projections in at least one of the parallel, spaced apart walls and complementary guide channels in the cover frame.

Preferably, there are a plurality of ecologically green units mounted on the existing wall.

The above and other features of the invention will become readily apparent from the following detailed description thereof which is to be read in connection with the accompanying drawings.

DETAILED DESCRIPTION

Figure 1:
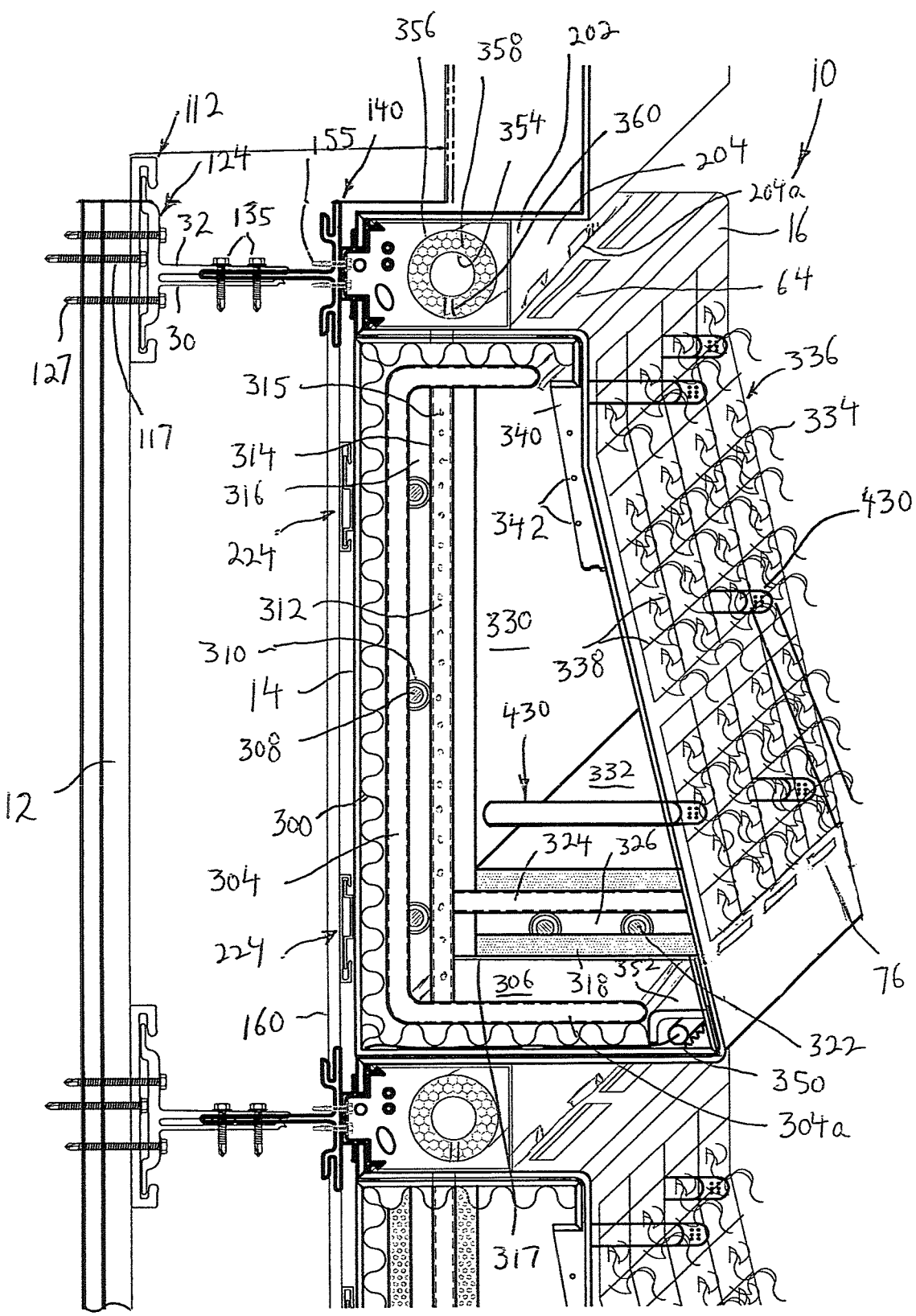
FIG. 1 is a cross-sectional view of an ecologically green unit according to the present invention.

Referring to the drawings in detail, and initially to FIG. 1 thereof, there is shown one ecologically green unit 10 assembled on a wall 12 of a building. Specifically, ecologically green unit 10 includes a base frame 14 adapted to be secured to wall 12, and a cover frame 16 in covering relation to base frame 14.

Figure 2:
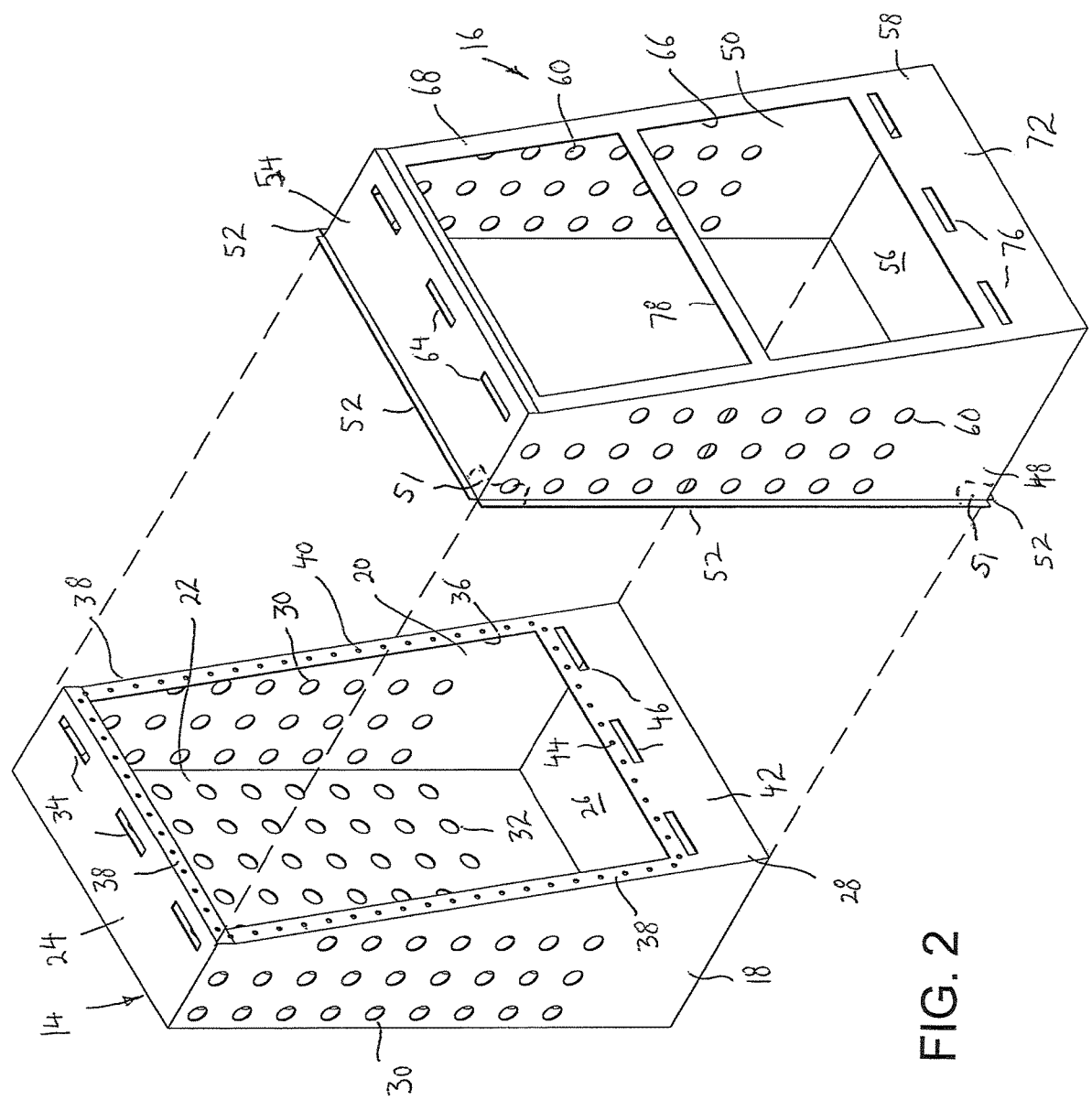
FIG. 2 is a perspective view of the base frame and cover frame of the ecologically green unit of FIG. 1.

As shown best in FIG. 2, base frame 14 includes two parallel, spaced apart trapezoidal shaped side walls 18 and 20 connected together at their rear edges by a rear wall 22, at the top edges by a top wall 24, at their bottom edges by a bottom wall 26 and at their front edges by a front wall 28. Side walls 18 and 20 in FIG. 1 are slightly different from those of FIG. 2, but generally of the same shape. The upper edge of each trapezoidal shaped side wall 18 and 20 is shorter than the lower edge thereof so that bottom wall 26 has a greater area than top wall 24, and front wall 28 is angled outwardly from its upper edge to its lower edge.

Each trapezoidal shaped side wall 18 and 20 includes a plurality of small openings 30 therein for the circulation of air therein. In like manner, rear wall 22 also includes a plurality of small openings 32 therein. Top wall 24 includes a plurality of, for example, three, drainage slots 34 in alignment with each other and spaced slightly from the front edge thereof. Front wall 28 includes a large rectangular opening 36 which is surrounded at its side edges and upper edge by a narrow border strip 38 having a plurality of aligned openings 40 therein. A larger border portion 42 is provided at the lower end of front wall 28 below opening 36 and serves as a water reservoir hold, as will be described hereinafter. A plurality of horizontally aligned small openings 44 are provided in border portion 42 immediately below the lower end of opening 36. Immediately below openings 44 are provided a plurality of, for example, three, drainage slots 46 in alignment with each other.

Cover frame 16 includes two parallel, spaced apart trapezoidal shaped side walls 48 and 50 which are connected at the top edges by a top wall 54, at their bottom edges by a bottom wall 56 and at their front edges by a front wall 58. Rear flanges 52 extend in a rear plane outwardly from the rear edges of side walls 48 and 50, top wall 54 and bottom wall 56. The side walls 48 and 50 in FIG. 1 are slightly different from those of FIG. 2, but generally of the same shape. The shape and dimensions of each trapezoidal shaped side wall 48 and 50 is the same as each trapezoidal shaped side wall 18 and 20 so as to fit thereover. The upper edge of each trapezoidal shaped side wall 48 and 50 is shorter than the lower edge thereof so that bottom wall 56 has a greater area than top wall 54, and front wall 58 is angled outwardly from its upper edge to its lower edge.

Each trapezoidal shaped side wall 48 and 50 includes a plurality of small openings 60 therein which are in alignment with openings 30 when cover frame 16 fits over base frame 14. Top wall 54 includes a plurality of, for example, three, drainage slots 64 in alignment with each other, spaced slightly from the front edge thereof and which are in alignment with drainage slots 34 when cover frame 16 fits over base frame 14. Front wall 58 includes a large rectangular opening 66 which is surrounded at its side edges and upper edge by a narrow border strip 68. A larger border portion 72 is provided at the lower end of front wall 58 below opening 66 and serves as part of the water reservoir hold, as will be described hereinafter. A plurality of horizontally aligned drainage slots 76 in alignment with each other are provided immediately below the lower edge of opening 66, with drainage slots 76 being in alignment with drainage slots 46 when cover frame 16 is positioned over base frame 14. In addition, a horizontal reinforcing bar 78 connects narrow border strip 68 at opposite sides of opening 66 to provide reinforcement of cover frame 16 and to bisect opening 66.

Figure 3:
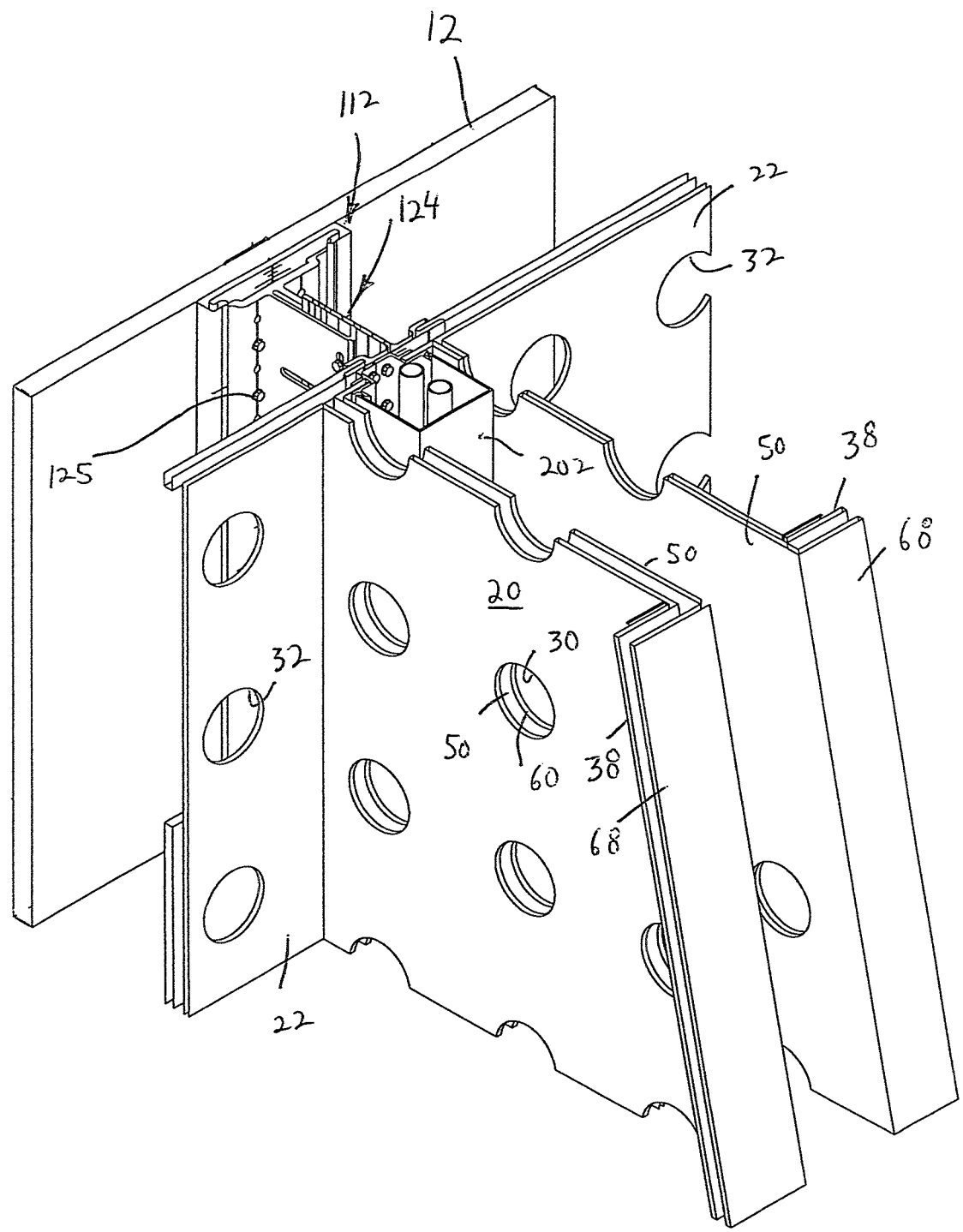
FIG. 3 is a perspective view of a portion of the ecologically green unit of FIG. 1, showing attachment to an existing wall.
Figure 4:
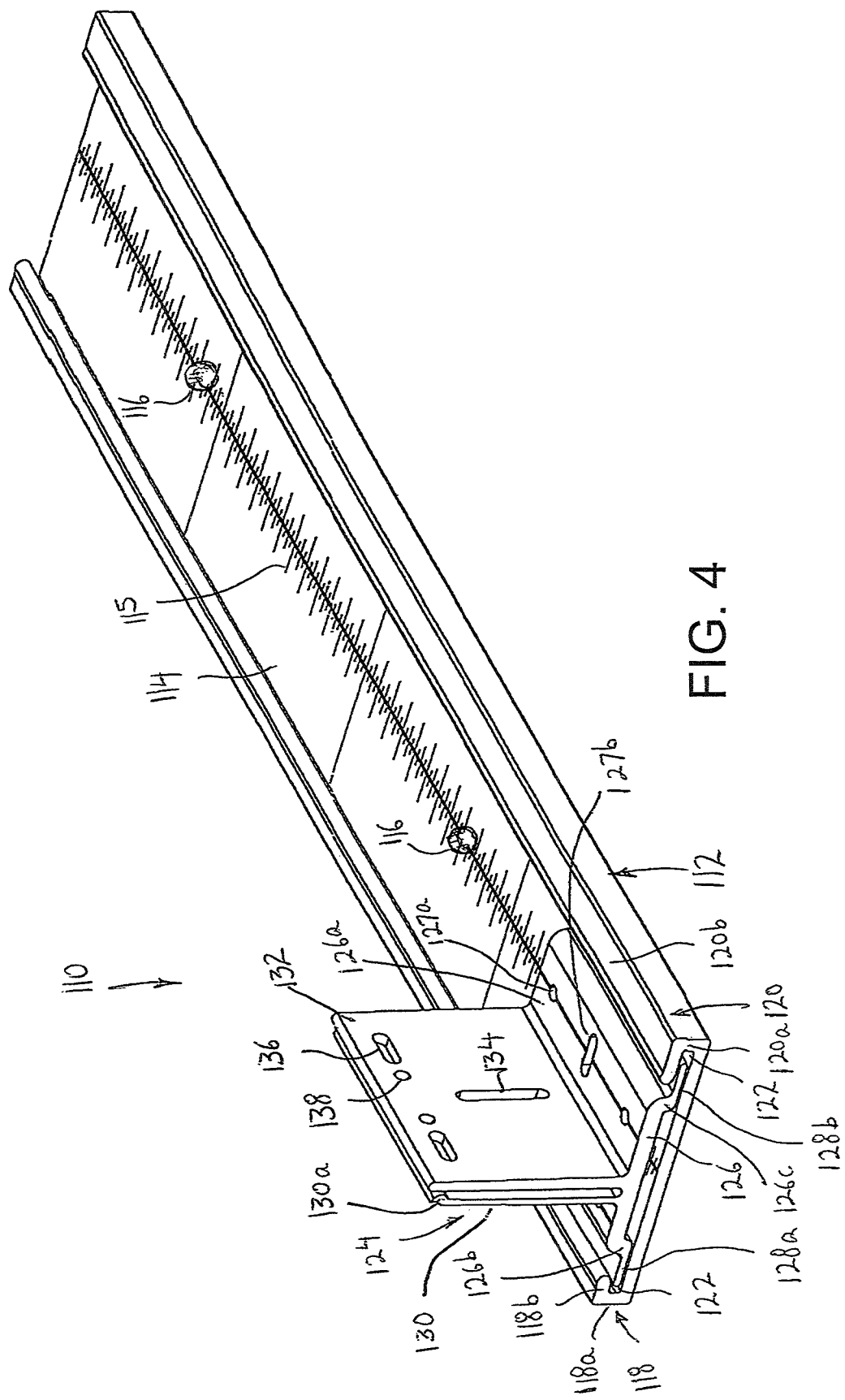
FIG. 4 is a perspective view of the base support and sliding support member for mounting the base frame and cover frame to an existing wall.

In order to secure base frame 14 and cover frame 16 to wall 12, reference is first made to FIGS. 1, 3 and 4, the latter FIG. 4 of which corresponds to Applicant's earlier filed U.S. patent application Ser. No. 15/488,897 filed Apr. 17, 2017, and the entire disclosure of this application is incorporated herein by reference.

Figure 5:
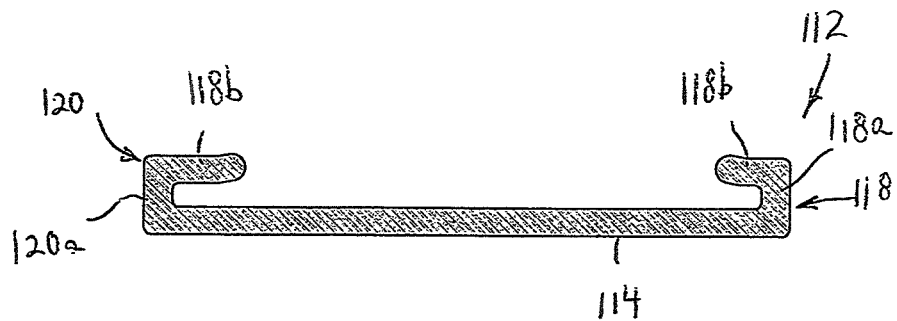
FIG. 5 is a cross-sectional view of the base support of FIG. 4.

As shown, a base assembly 110 including an elongated base support 112 that is adapted to be secured to existing wall 12. Base support 112 includes an elongated base plate 114 having measuring gradations 115 along the upper surface thereof and openings 116 therealong through which screws 117 extend to secure base plate 114 to the existing wall. L-shaped retaining walls 118 and 120 extend outwardly from opposite side edges of base plate 114. Specifically, each L-shaped retaining wall 118, 120 includes a first wall 118a, 120a that extends at a right angle from a side edge of base plate 114 and an inwardly extending second wall 118b, 120b that extends toward the opposite side edge of base plate 114 in parallel spaced apart relation to base plate 114 with a space 122 therebetween. Preferably, inwardly extending second wall 120b has a greater width than inwardly extending second wall 118b, as show best in FIG. 5, although the present invention is not limited thereto.

An adjustment arrangement for adjustably securing the base frame 114 to base support 112 at a position with at least two degrees of freedom, includes a sliding support member 124 slidably retained within base support 112. Sliding support member 124 includes a central member formed by an inverted U-shaped plate 126 that fits in the space between the spaced-apart free edges of second walls 118b, 120b. Inverted U-shaped plate 126 thereby includes an upper plate 126a and two downwardly extending leg plates 126b, 126c at opposite ends thereof that position upper plate 126a in parallel, spaced apart relation from the upper surface of base plate 114. A plurality of threaded openings 127a and at least one slot 127b extend through upper plate 126a.

Wing plates 128a, 128b extend outwardly from opposite free ends of leg plates 126b, 126c at the side edges of inverted U-shaped plate 126, with wing plates 128a, 128b slidably retained in spaces 122. It will be appreciated that the distance between the free end edges of wing plates 128a, 128b is less than the distance between first walls 118a, 120a of L-shaped retaining walls 118, 120 so as to permit lengthwise sliding adjustment of sliding support member 124 along a first lengthwise direction of base support 112, while also permitting transverse, side to side sliding adjustment of sliding support member 124 within base support 112 along a second transverse direction, thereby providing two degrees of freedom.

In this manner, adjustment bolts 125 (FIG. 3) are adapted to be threadedly received within threaded openings 127a to engage the upper surface of base plate 114 in order to adjust the height of sliding support member 124 relative thereto and tightly secure sliding support member 124 with base plate 114. In other words, as bolts 125 are rotated, with the free ends of bolts 125 in contact with the upper surface of base plate 114, sliding support member 124 moves up or down on bolts 125, depending upon the direction of rotation of bolts 125, to thereby raise or lower sliding support member 124. This also causes the upper surfaces of wing plates 128a and 128b to tightly engage against the underside of second walls 118b and 120b, respectively, to lock sliding support member 124 in that position. Thereafter, a screw 127 (FIG. 1) can be inserted through each slot 127b into base plate 114 and into the existing wall 12, to further lock sliding support members 124 in position. Thus, sliding support member 124 can be locked to base plate 114 after sliding support member 124 has been moved and adjusted in the first lengthwise direction and second transverse direction. Further, slots 127b permit further later transverse adjustment by loosening any screws therein, transversely adjusting sliding support member 124 and retightening the screws.

Figure 6:
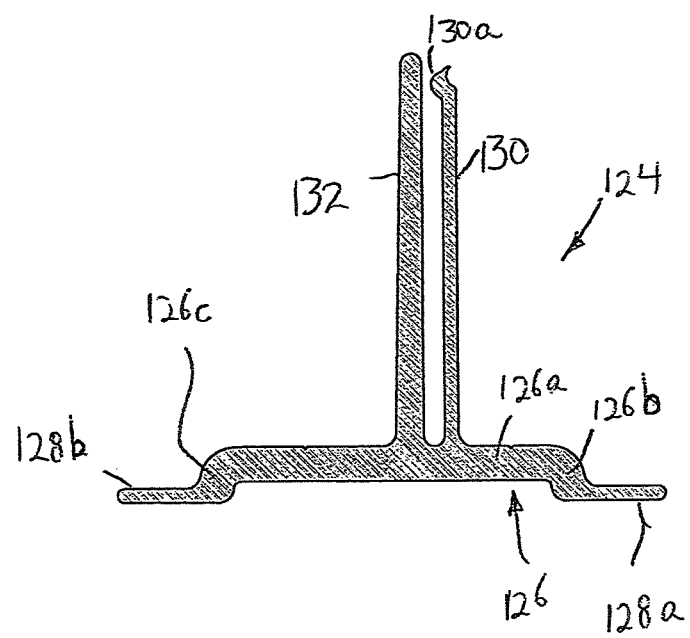
FIG. 6 is a cross-sectional view of the sliding support member of FIG. 4.

Two parallel, spaced apart capture walls 130, 132 extend upwardly at the center of upper plate 126a, preferably along the entire length of upper plate 126a. The upper end of capture wall 130 includes an inwardly directed lip 130a, as best shown in FIG. 6. Each capture wall 130, 132 preferably includes at least one slot 134 oriented in a third direction which is orthogonal to the first lengthwise direction and second transverse direction, at least one slot 136 oriented in the first lengthwise direction and at least one circular threaded opening 138.

Figure 7:
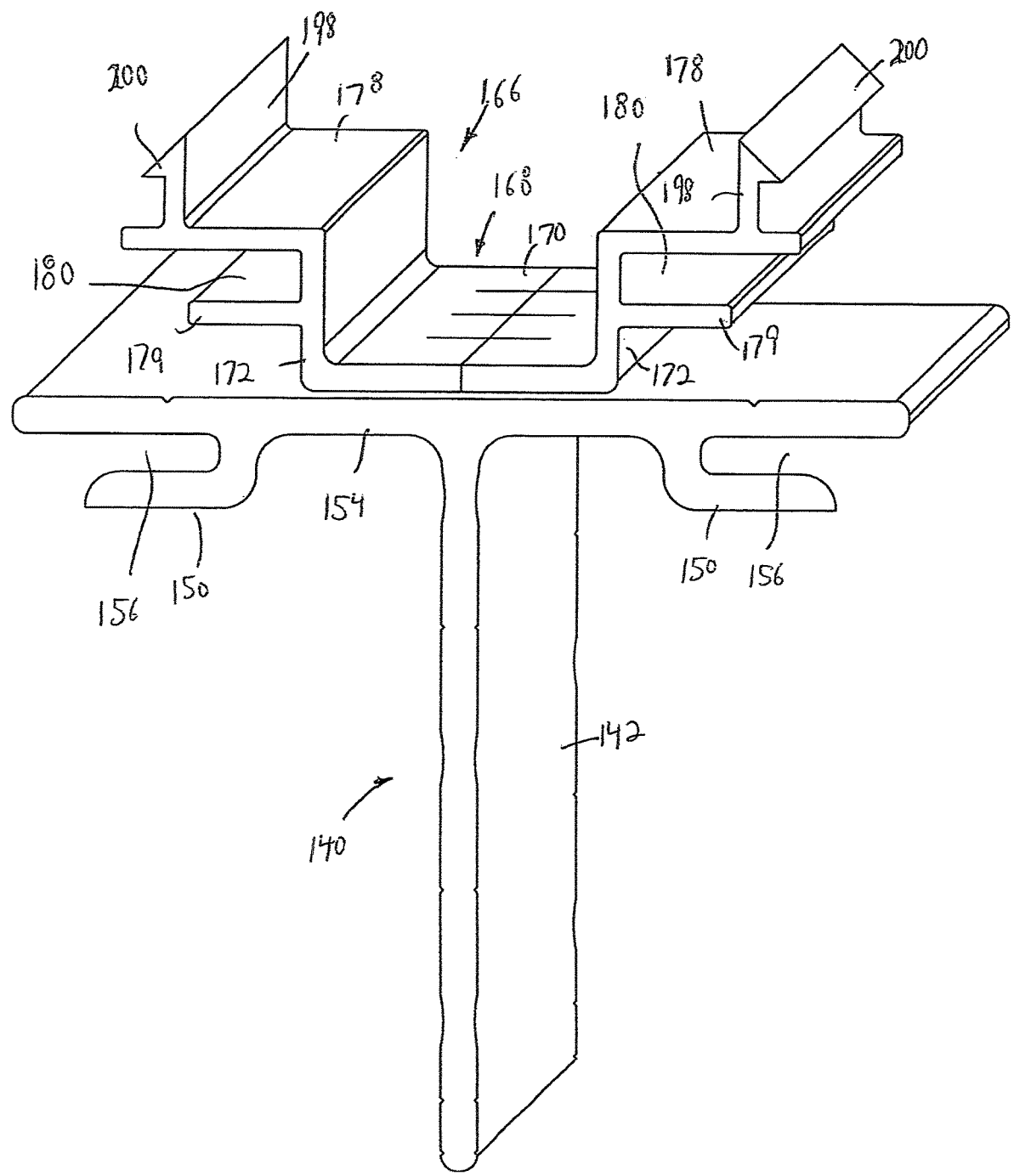
FIG. 7 is a perspective view of an adjustment support member for assembly with the sliding support member.
Figure 8:
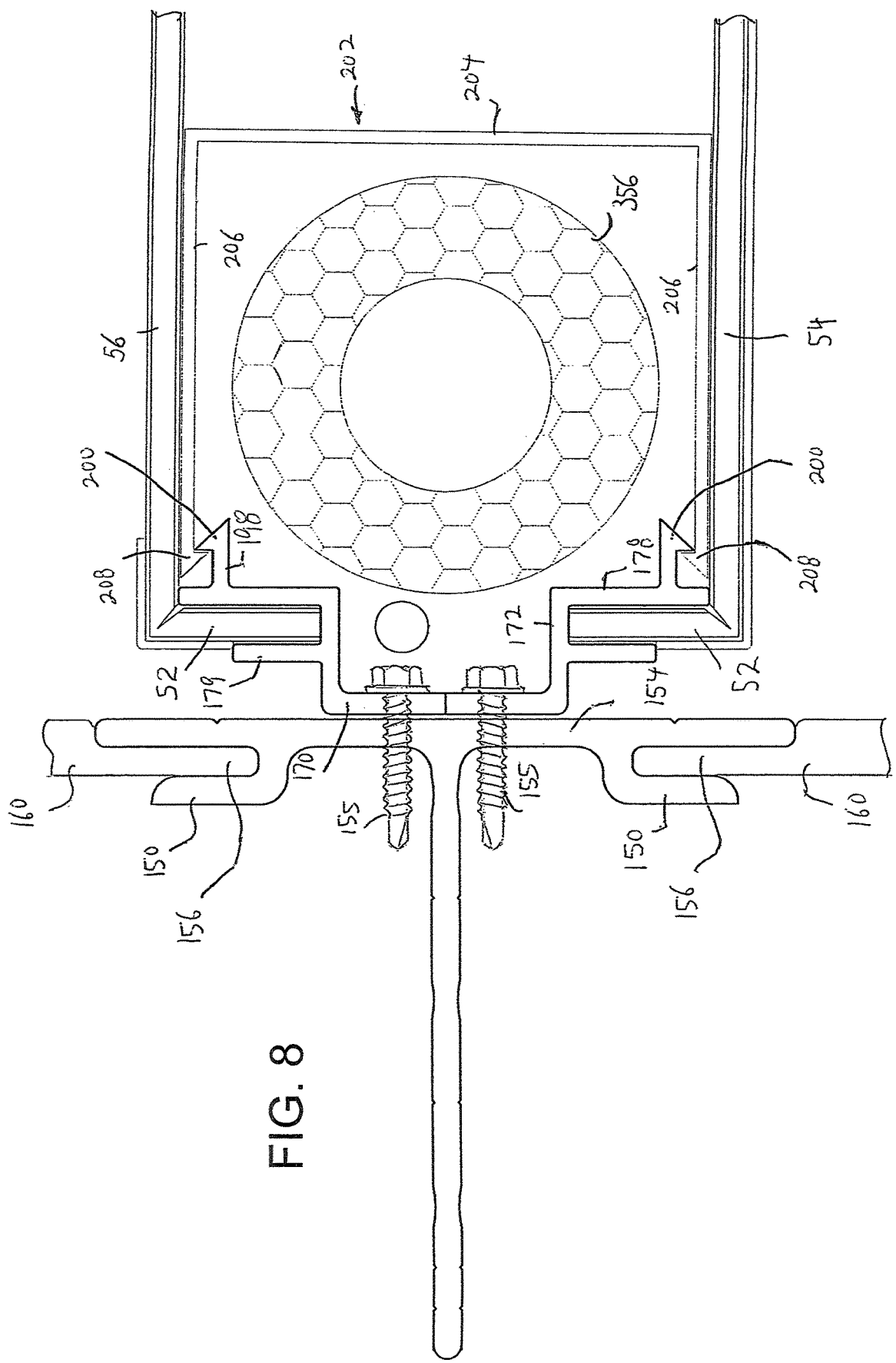
FIG. 8 is a plan view of the adjustment support member of FIG. 7, assembled with the cover frame of two adjacent ecologically green units.

As shown in FIGS. 7 and 8, an adjustment support member 140 includes an elongated rectangular plate 142 that is dimensioned to fit snugly between capture walls 130 and 132, such that retaining lip 130a applies pressure to plate 142. The opposite free lengthwise edge of rectangular plate 142 is fixed centrally to the lower surface of a platform wall 154. Two L-shaped walls 150 extend from the underside of platform wall 154 on opposite sides of rectangular plate 142 and face away from rectangular plate 142, whereby a gap 156 is defined between each L-shaped wall 150 and platform wall 154 for receiving an end of a connecting panel 160 therein, which connects together spaced apart adjustment support members 140.

A support member 166 is mounted on each modified adjustment support member 140 and includes a U-shaped support 168 having an elongated rectangular lower plate 170 and two upstanding, parallel, spaced apart walls 172 extending in the third direction from opposite lengthwise edges of lower plate 170. Rectangular lower plate 170 is secured centrally to the upper surface of platform wall 154 by screws 155 (FIG. 1). A retaining wall 178 is connected to the outer free end of each wall 172 and extends in a direction in the second transverse direction in parallel, spaced apart relation to lower plate 170 but extending outwardly in a direction away from lower plate 170. A retaining wall 179 extends outwardly from the outer surface of each wall 172 in parallel, spaced relation from retaining wall 178 so as to provide a space 180 therebetween for capturing rear flanges 52 of cover frame 16.

Catch walls 198 extend outwardly from the exposed surface of each retaining wall 178 in the third direction at a position slightly spaced inwardly from the outer edge thereof. Each catch wall 198 includes an outwardly facing V-shaped catch 200 at the upper end thereof.

In this manner, support member 166 is preferably assembled separately with cover frame 16, and then assembled with platform 154 by screws 155.

As shown in FIG. 8, a water supply pipe 356 is positioned between a bottom wall 56 of a cover frame 16 of one unit 10 and a top wall 54 of a cover frame 16 of another unit 10 positioned below the first unit 10. Accordingly, a modified cover 202 is provided having a central wall 204 adapted to be secured in covering relation to water supply pipe 356, and capture walls 206 at opposite ends thereof which extend in parallel adjacent relation to the respective bottom wall 56 of the cover frame 16 of one unit 10 and the top wall 54 of the cover frame 16 of the other unit 10 positioned below the first unit 10. Each capture wall 206 has an inwardly facing V-shaped latch 208 at the free end thereof for engaging with a respective V-shaped catch 200.

With the above arrangement, plate 142 can be moved in the first lengthwise direction, as well as a third direction which is orthogonal to the first lengthwise direction and second transverse direction, and once positioned at the desired location, is secured in that position by screws 135 (FIG. 1) extending through at least one of slots 134, 136 and openings 138. Although there are no fixed openings in plate 142, the screws can still pass therethrough. Alternatively, openings can also be provided in plate 142. Further, at any time, the screws can be loosened, plate 142 is then adjusted in position and the screws are retightened. Alternatively, it will be appreciated that slots 134, 136 and openings 138 can be provided in plate 142 instead of, or in addition to, capture walls 130 and 132.

Preferably, base support 112, support member 24 and adjustment support member 140 are made of a thermally isolated material such as polyamide, an equivalent thereof or any other suitable material.

With the above arrangement, it will be appreciated that adjustment of the position of the base frame 14 and cover frame 16 on wall 12 can occur in the first lengthwise, second transverse and third orthogonal directions by adjustment of sliding support members 124 in base support 112, and in the third orthogonal direction as well as the first lengthwise direction by adjustment of plates 142 in sliding support members 124.

Figure 9:
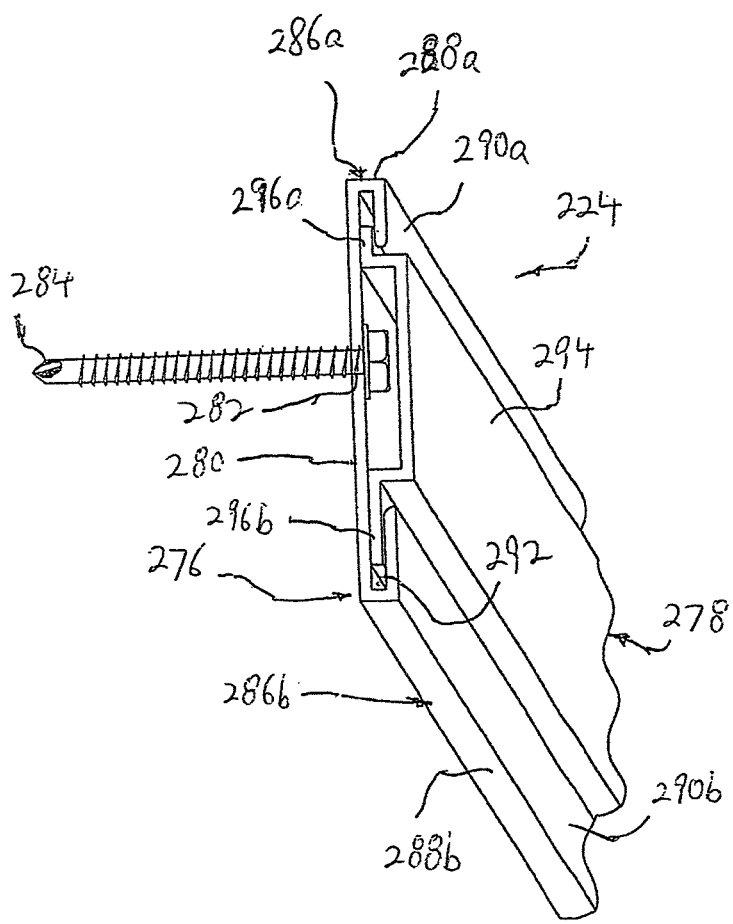
FIG. 9 is a perspective view of a structural support assembly for connecting a base frame to the existing wall.

Further, in order to secure base frame 14 to wall 12, reference is first made to FIGS. 1 and 9, the latter FIG. 9 of which corresponds to Applicant's earlier filed U.S. patent application Ser. No. 15/164,117, filed May 25, 2016, and the entire disclosure of this application is incorporated herein by reference.

Specifically, a structural support assembly 224 includes a base support 276 that is secured to existing wall 12 and a sliding support member 278 that is slidably retained within base support 276.

Base support 276 includes an elongated base plate 280 having openings 282 therein through which screws 284 extend to secure base plate 280 to connecting panel 160, and L-shaped retaining walls 286a and 286b that extend outwardly from opposite side edges of base plate 280. Specifically, each L-shaped retaining wall 286a, 286b includes a first wall 288a, 288b that extends at a right angle from a side edge of base plate 280 and an inwardly extending second wall 290a, 290b that extends toward the opposite side edge of base plate 280 in parallel spaced apart relation to base plate 280 with a space 292 therebetween. Preferably, inwardly extending second wall 290b has a greater width than inwardly extending second wall 290a, although the present invention is not limited thereto.

Sliding support member 278 includes an inverted U-shaped plate 294 that fits in the space between the spaced-apart free edges of second walls 290a, 290b, and wing plates 296a, 296b at opposite free ends at the side edges of inverted U-shaped plate 294, with wing plates 296a, 296b slidably retained in spaces 292. Preferably, wing plate 296b has a greater width than wing plate 296a, although the present invention is not limited thereto. It will be appreciated that the distance between free edges of wing plates 296a, 296b is less than the distance between first walls 288a, 288b of each L-shaped retaining wall 286a, 286b so as to permit side to side sliding of sliding support member 278 within base support 276.

An adhesive member which can be a double sided tape, an adhesive or any other securing means, such as screws, can be used to secure inverted U-shaped plate 294 of sliding support member 278, to rear wall 22.

With the above arrangement, base supports 112 are secured to wall 12 by screws 117. Sliding support members 124 are then slidably positioned in base supports 112 to a desired position, after being adjusted in the first lengthwise direction, second transverse direction and even slightly in the third orthogonal direction by adjusting bolts 125. Sliding support members 124 are then fixed in position within base supports 112 by screws 117.

Thereafter, adjustment support members 140 are positioned between retaining walls 130 and 132 of sliding support members 124, and then fixed thereto by screws 135. A connecting panel 160 is connected between spaced apart adjustment support members 140, and specifically, within gaps 156 therein. Of course, it will be appreciated that generally, one base support 112, its respective sliding support member 124 and its respective adjustment support member 140 will first be assembled, followed by one end of a connecting panel 160. Then, a cover frame 16 is assembled over an already assembled base frame 14, with rear flanges 52 held within spaces 180 of a first adjustment support member 140. Thereafter, another base support 112, sliding support member 124 and adjustment support member 140 are connected with the opposite end of the connecting panel 160, and the process continues in such manner thereafter with another base frame 14 and cover frame 16. Then, covers 202 are snapped into position between adjacent cover frames 16, as shown in FIGS. 1 and 3.

Of course, it will be appreciated that any other suitable arrangement can be used for securing base frame 14 and cover frame 16 to wall 12, and the present invention is not limited to the specific arrangement disclosed.

Figure 10:
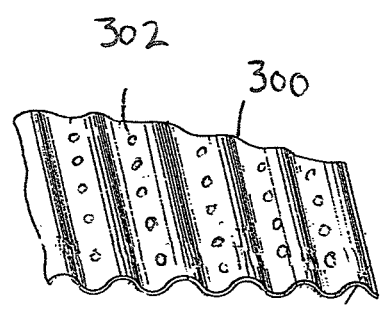
FIG. 10 is a perspective view of a portion of a barrier wall within the base frame.

As shown in FIG. 1, an undulating or sinusoidally shaped barrier wall 300 is provided at the inside of side walls 18 and 20, rear wall 22, top wall 24 and bottom wall 26 of base frame 14. Barrier wall 300 is provided to retain any dirt and other solid materials within base frame 14 and includes a plurality of small openings 302 (FIG. 10) therein for passage of air and water therethrough. A capillary mat 304 is positioned on top of barrier wall 300 at the inside of side walls 18 and 20, rear wall 22, top wall 24 and bottom wall 26 of base frame 14. Specifically, a capillary mat section 304a at bottom wall 26 sits within a water reservoir area 306, which will be described hereafter, and wicks water from capillary mat section 304a upwardly to the remainder of capillary mat 304.

Figure 11:
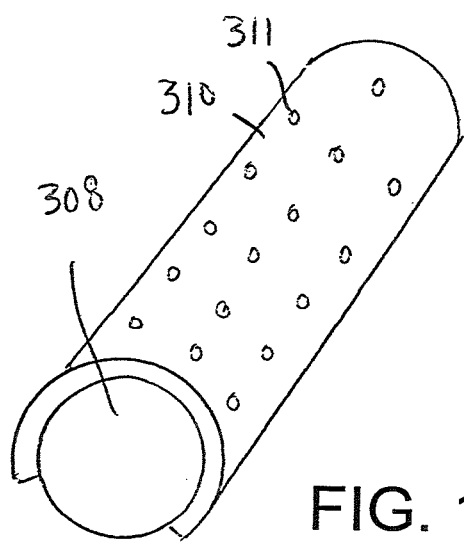
FIG. 11 is a perspective view of a capillary tube and its protective sheath.

Horizontally oriented capillary tubes 308 are in water transfer contact with capillary mat 304 in order to receive water from capillary mat 304 and transfer the water horizontally of base frame 14. Capillary tubes 308 extend in the widthwise direction of base frame 14 and are in parallel relation to each other, and spaced apart vertically from each other. Each capillary tube 308 is surrounded by a protective rigid sheath or tube 310 which provides support for the capillary tube 308 and which has a plurality of small openings 311 (FIG. 11) around the circumference thereof. In like manner, vertically oriented capillary tubes 312 are in water transfer contact with capillary mat 304 in order to receive water from capillary mat 304 and transfer the water vertically of base frame 14. Capillary tubes 312 extend in the widthwise direction of base frame 14 and are in parallel relation to each other, and spaced apart horizontally from each other. Capillary tubes 312 are also surrounded by a protective sheath 314 which provides support for the capillary tube 308 and which has openings 315 therein. Vertically oriented capillary tubes 312 are positioned in overlying relation on horizontally oriented capillary tubes 308, and together, capillary tubes 308 and 312 form a vertically oriented matrix with empty spaces 316 therebetween.

A horizontally oriented matrix of capillary tubes is also provided, and is positioned slightly above bottom wall 56, spaced above in parallel relation to capillary mat section 304a of capillary mat 304. Specifically, the horizontally oriented matrix includes a plurality of horizontally oriented capillary tubes 318 in water transfer contact with reservoir 306 in order to receive water therefrom and transfer the water horizontally of base frame 14. Capillary tubes 318 extend in the depthwise direction of base frame 14 and are in parallel relation to each other, and spaced apart horizontally in the widthwise direction of base frame 14 from each other. Each capillary tube 318 is surrounded by a protective sheath in the same manner as described above. In like manner, horizontally oriented capillary tubes 322 are in water transfer contact with and positioned on top of capillary tubes 318 in order to receive water from capillary tubes 318 and transfer the water horizontally in the widthwise direction of base frame 14. Capillary tubes 322 extend in the widthwise direction of base frame 14 and are in parallel relation to each other, and spaced apart horizontally in the depthwise direction of base frame 14 from each other. Capillary tubes 322 are also surrounded by a protective sheath in the manner discussed above. Further horizontally oriented capillary tubes 324 are positioned on top of horizontally oriented capillary tubes 322 in parallel relation to capillary tubes 318. Together, capillary tubes 318, 322 and 324 form a horizontally oriented matrix with empty spaces 326 therebetween.

It will be appreciated that the capillary mat is of a soft flexible material, but because of the rigid sheaths around the capillary tubes, capillary mat is supported by these rigid sheaths.

A plant growing mat 330 made of woven fabric, felt or other suitable material is provided over and in water transfer contact with vertically oriented capillary tubes 312 and extends the entire width and depth of base frame 14, and a plant growing mat 332 made of woven fabric, felt or other suitable material is provided over and in water transfer contact with vertically oriented capillary tubes 324 and extends the entire width and depth of base frame 14.

Figure 18:
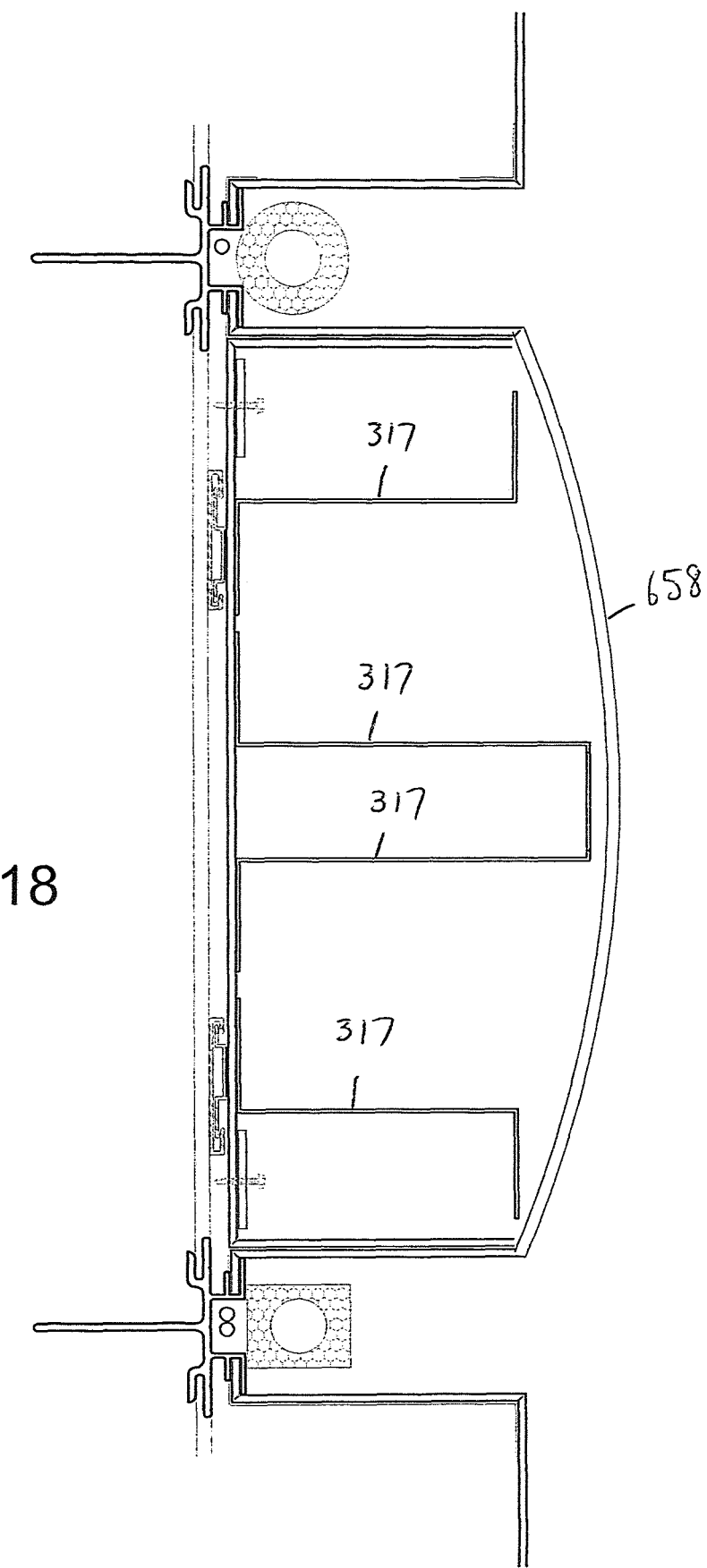
FIG. 18 is a cross-sectional view of a modified ecologically green unit with a convex front wall.
Figure 19:
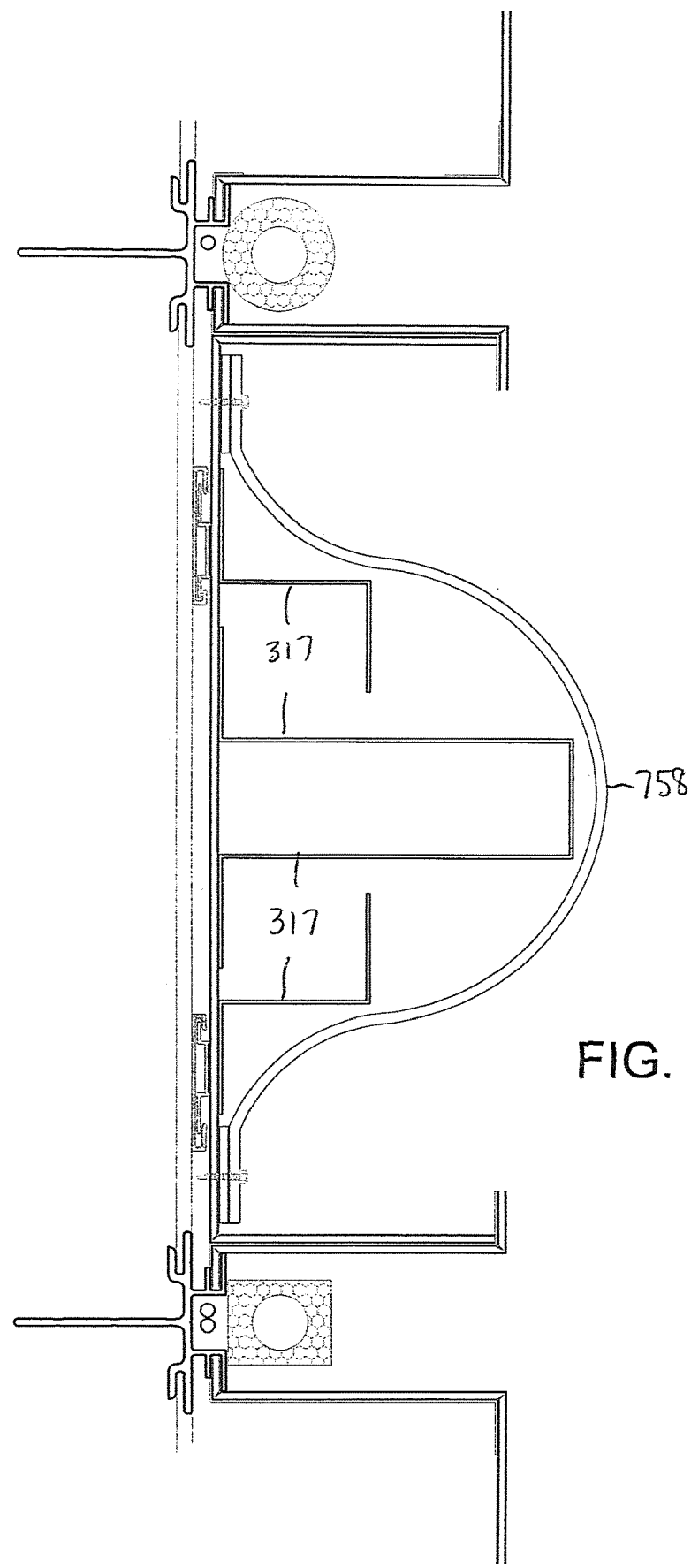
FIG. 19 is a cross-sectional view of a modified ecologically green unit with a bell shaped front wall.

In order to prevent soil from entering reservoir 306 which is filled with water, a porous sheet 317 is provided immediately beneath capillary tubes 318. However, it will be appreciated that porous sheet 317 permits passage of air and water therethrough. Instead of a porous sheet 317, any other suitable sheet can be used, for example, a fine mesh screen, a porous cap, a cap with small openings or the like. In addition, porous sheet 317 can be provided at a plurality of different spaced apart height levels in base frame 14, for example, as shown in FIGS. 18 and 19.

With the arrangement thus far described, plants 334 are grown on plant growing mats 330 and 332, with the roots of the plants extending through mats 330 and 332, into soil (not shown) positioned in the empty spaces 316 and 326 of the matrices between the various capillary tubes. Water is supplied to the soil by means of the capillary tubes, and other means which will be described hereinafter. Standing water is provided in water reservoir area 306 in order to wet capillary mat 304 and capillary tubes 312 and 318, and if any standing water starts to rise to a level above capillary tubes 318, the excess water spills out through drainage slots 46 and 76. Only the portion of the plants 334 extending out from cover frame 16 are shown in FIG. 1, and the remainder of the plants 334, including their stems and roots, are not shown.

It will be appreciated that, as water reservoir area 306 fills too high, any excess water will spill out through discharge openings 76 and fall on to the outer surface and the plants 334 of the ecologically green unit 10 below it. Because of the large rectangular openings 60 and the wire mesh arrangement therein, this excess water will also fall within the interior of the ecologically green unit 10 below it.

In order to properly guide and orient plants 334 so that the plants 334 do not droop or sag, that is, to support the plants 334 and to allow for growth thereof, a wire mesh arrangement 336 is provided at front wall 42 of base frame 14. FIG. 1 shows one manner of connecting the individual wires 338 of wire mesh arrangement 336. It will be appreciated that each wire 338 is connected separately and individually from other wires 338 so that if one fails, the remaining wires 338 remain intact. Specifically, bent flanges 340 are provided along the border of front wall 46, and include spaced openings 342 by which individual wires 338 are connected in a horizontal and vertical orientation to provide the wire mesh arrangement 336. Only a portion of one bent flange 340 is shown in FIG. 1.

However, preferably, the individual wires 338 are connected between opposite small openings 40 and 44 of base frame 14 of FIG. 2 in horizontal and vertical directions.

With such arrangement, the roots of the plants 334 are firmly attached to mats 330 and 332, as well as in the soil behind the mats, and the free flowering or leaf portions of the plants 334 are supported in the wire mesh arrangement 336.

In addition to the above, a lighting effect can be imparted to the ecologically green units 10 and plants 334. Thus, lights 350 can be positioned in a lower portion of base frame 14, surrounded by a transparent plastic cover 352 to seal lights 350 from the reservoir water. The light will therefore shine inside of ecologically green unit 10 in order to illuminate the plants therein. Alternatively, or in addition to, bottom walls 26 and 56 can be transparent, or have openings therein, to project the light to the ecologically green unit 10 positioned therebelow. Lighting can also be provided at the upper end of each ecologically green unit 10, or at any other suitable location.

In addition, as shown in FIG. 1, in order to provide additional water to the plants 334, a hollow pipe 354 is positioned above each ecologically green unit 10 for supplying water thereto. Each hollow pipe 354 is surrounded by an annular pipe 356 through which wires 358 and the like can extend. For example, wires 358 can include heating wires to prevent freezing of water within hollow pipe 354. Each hollow pipe 354 includes a plurality of openings which are in fluid communication with at least one passage 360 that opens immediately above top wall 54 of cover frame 16, but which is still positioned within cover 202. In this regard, cover 202 is provided with openings 204a in its central section 204 through which water from hollow pipe 354 and passage 360 can exit and then passed through drainage slots 64 into the interior of ecologically green unit 10 in order to provide water for plants 334. It will be appreciated that plant nutrients can also be supplied to the plants through hollow pipe 354.

Figure 12:
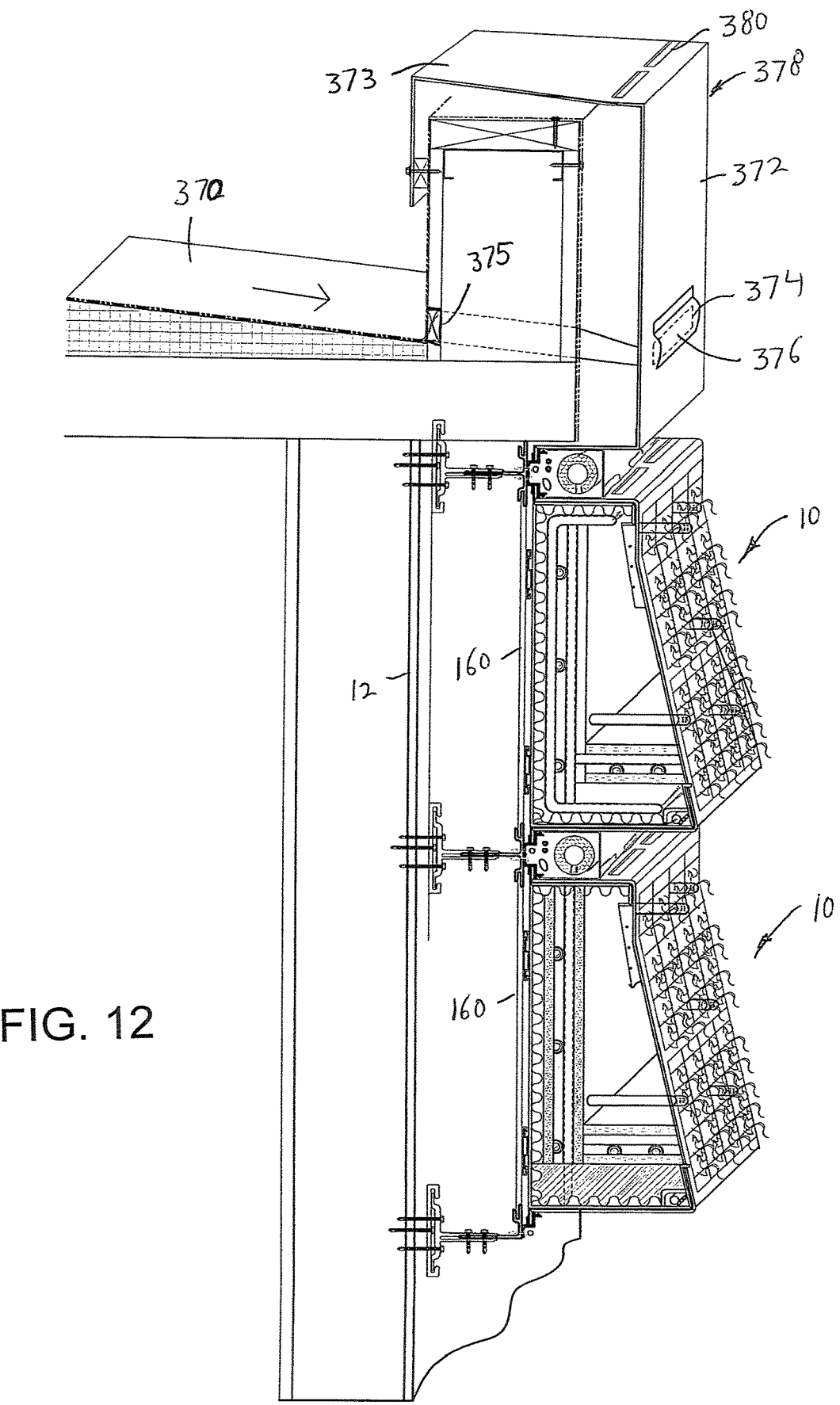
FIG. 12 is a perspective view of two ecologically green units along with a ramp assembly for feeding rainwater thereto.

FIG. 12 shows two ecologically green units 10 positioned one above the other. At the top of the building, a ramp 370 is provided to collect rainwater. Ramp 370 is angled down towards the front of the building and the ecologically green units 10. Ramp 370 continues to an upper front wall 372 positioned immediately above top wall 54 of the uppermost ecologically green unit 10. An opening 374 is provided in front wall 372 to permit the water from ramp 370 to exit onto top wall 54 of the uppermost ecologically green unit 10. To correctly guide the water from opening 374 to the top wall 54, a flap 376 is hinged to the outside of front wall 372 immediately above opening 374, such that flap 376 covers opening 374. Flap 376 ensures that the water exiting opening 374 falls on the top wall 54 of the uppermost ecologically green unit 10, and thereby flows through discharge slots 64 thereof.

In addition, the front portion of ramp 370 is covered by a building structure 378 of which front wall 372 forms a part, with openings 380 in an upper wall or coping 373 thereof for collecting rainwater which then falls on ramp 372.

A water valve 375 can be provided at a position where ramp 370 enters building structure 378 in order to block water from entering building structure 378. In such case, raised drain at water valve 375 can be provided to drain off the excess water from ramp 370 to a suitable location.

Figure 13:
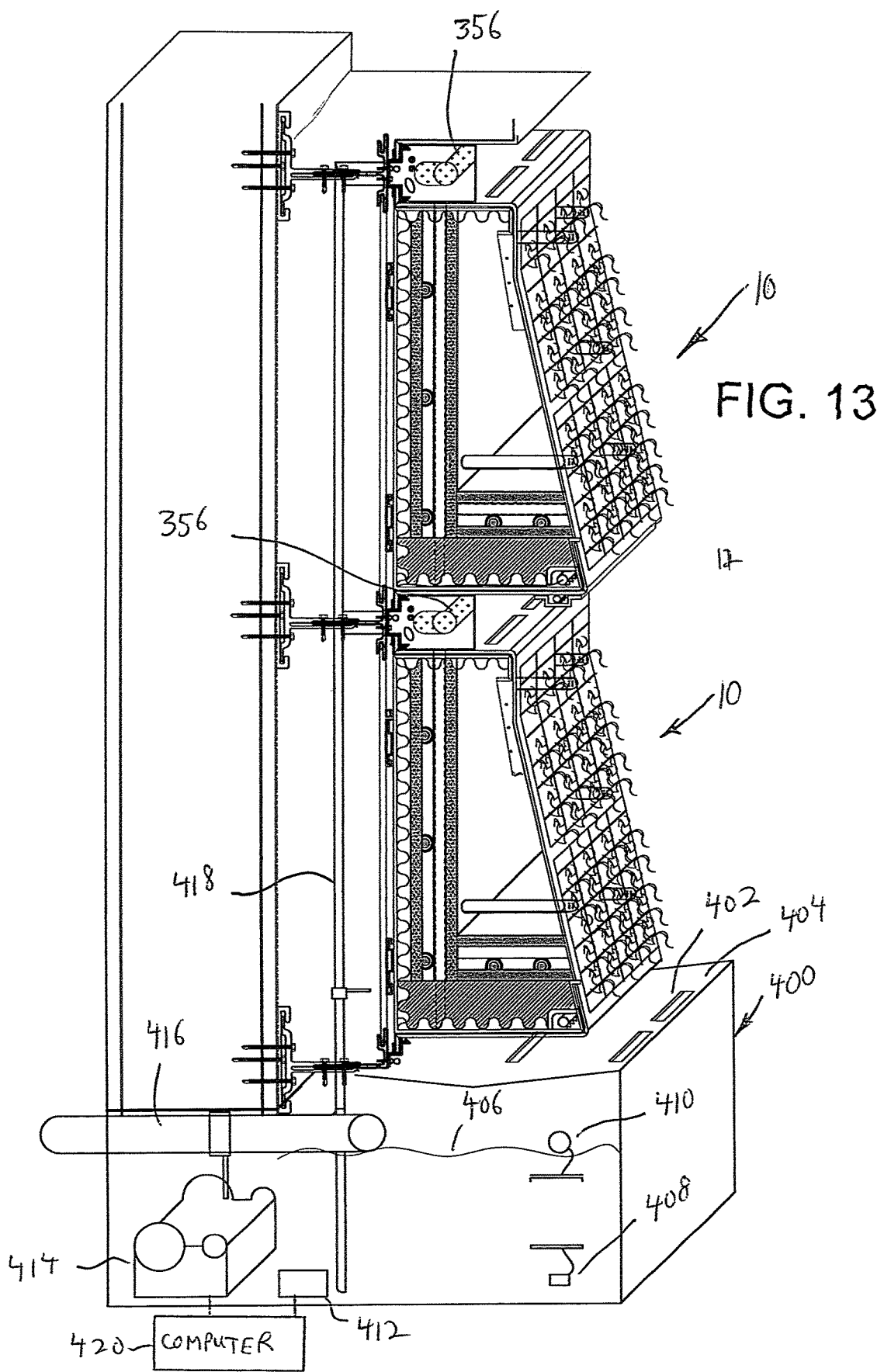
FIG. 13 is a perspective view of two ecologically green units along with a pump for pumping water from a reservoir to the units.

As shown in FIG. 13, below the lowermost ecologically green unit 10, there is a water reservoir tank 400 having openings 402 at the upper surface 404 thereof by which drainage from any of the ecologically green units 10 thereabove can be received. The level 406 of water in water reservoir tank 400 is preferably regulated to be within a certain range by means of a low water level sensor 408 and a high water level sensor 410 in water reservoir tank 400. A thermostat 412 is preferably also provided in water reservoir tank 400 for controlling a heater (not shown) by which the temperature of the water can be regulated. A pump 414 pumps the water from water reservoir tank 400 to a building water pipe 416 and then to a water feed pipe 418 which supplies the water to annular pipes 356. Pump 414 can be controlled by a computer system 420 to control the timing of the pumping, the amount of water pumped, etc.

Figure 14:
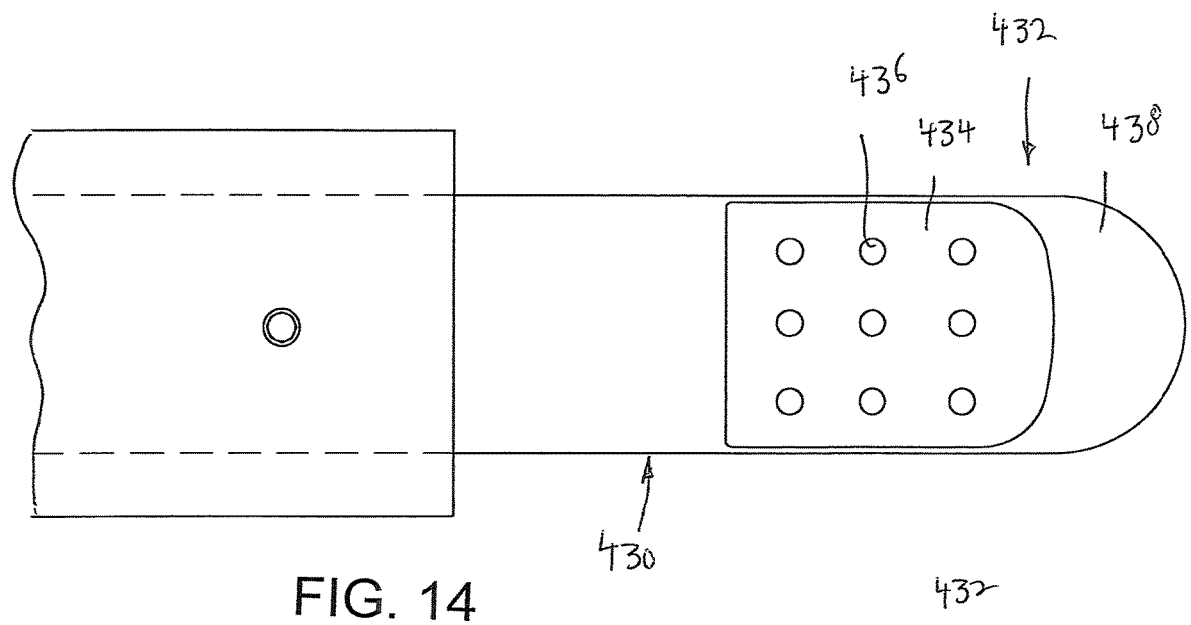
FIG. 14 is a top plan view of a light and water guide tube.
Figure 15:
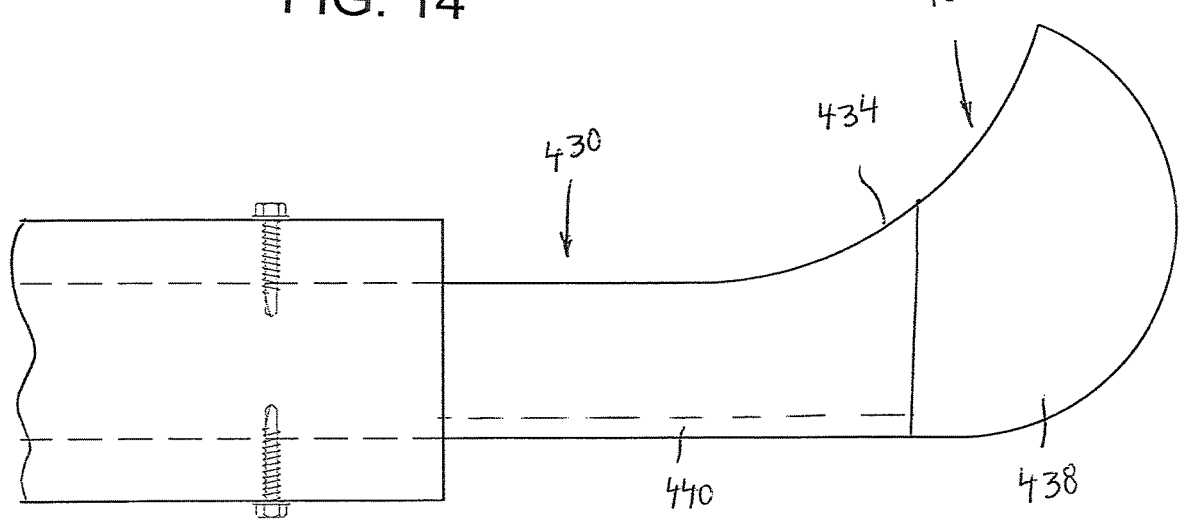
FIG. 15 is a side plan view of the light and water guide tube of FIG. 14.

In addition to water and plant nutrients, it is also important that plants receive sufficient sunlight. In this regard, a plurality of light and water guide tubes 430 extend outwardly from growing mat 330 or any other suitable location within base frame 14, to a position in front of cover frame 16. As shown best in FIGS. 14 and 15, each guide tube 430 includes an enlarged free end 432 with an upturned curved upper surface 434 having a plurality of openings 436 therein to collect rainwater. Because of the slight inclination of each guide tube 430, any water entering openings 436 will automatically travel by gravity to the interior of the ecologically green unit 10. In addition, enlarged free and 432 includes a removable glass cap 438 to receive any sun exposure which then travels through the guide tube 430 to the interior of ecologically green unit 10. In such case, the portion of guide tube 430 within base frame 14 will be transparent in order to emit the light therein to aid in plant growth. A vitamin feeding channel 440 can also be provided at the lower portion of guide tube 432 to deliver vitamins and nutrients to the plants.

Figure 16:
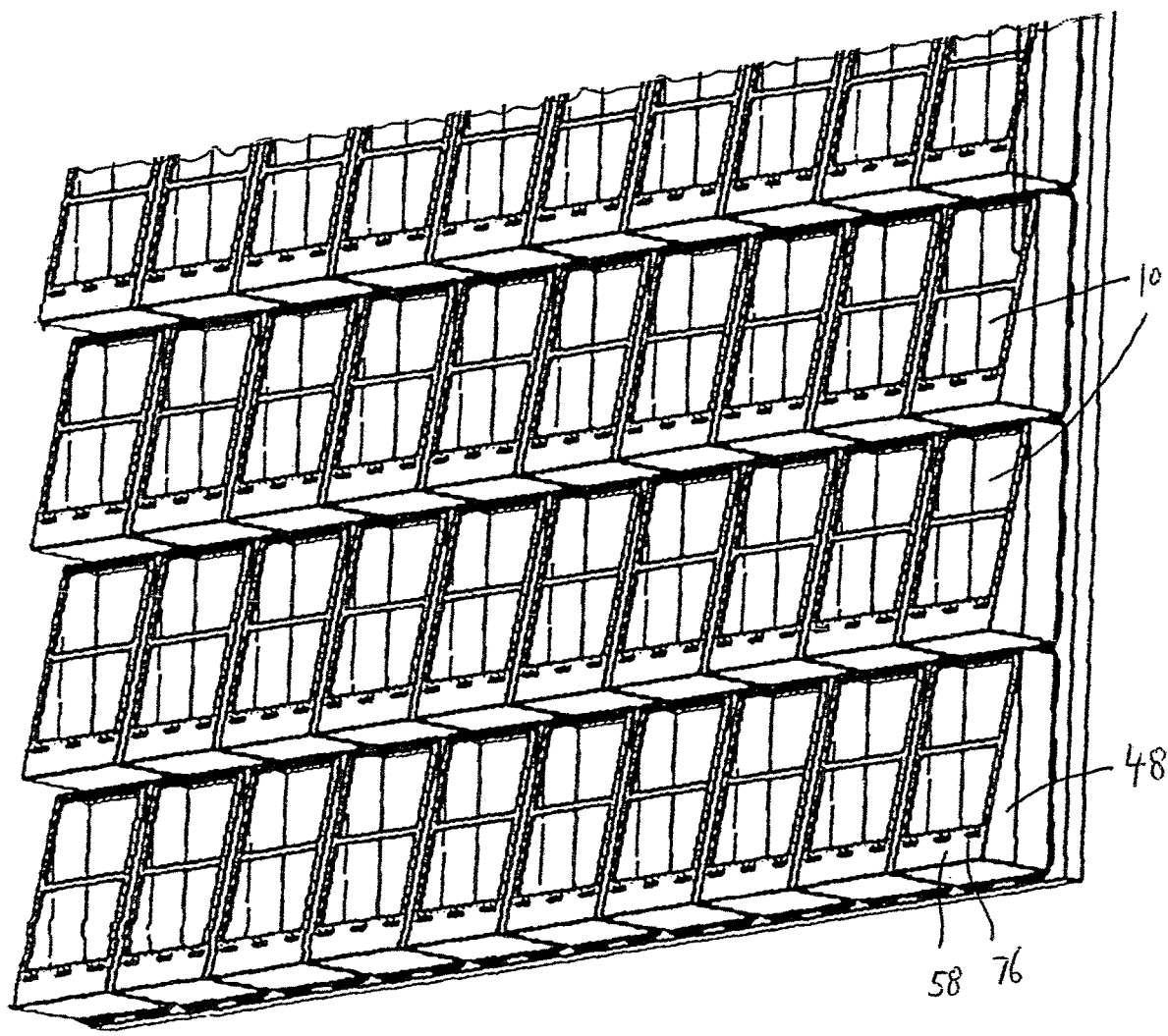
FIG. 16 is a perspective view showing a plurality of ecologically green units mounted on an existing wall.

As shown in FIG. 16, an entire wall of the building can be covered by a plurality of ecologically green units 10.

Figure 17:
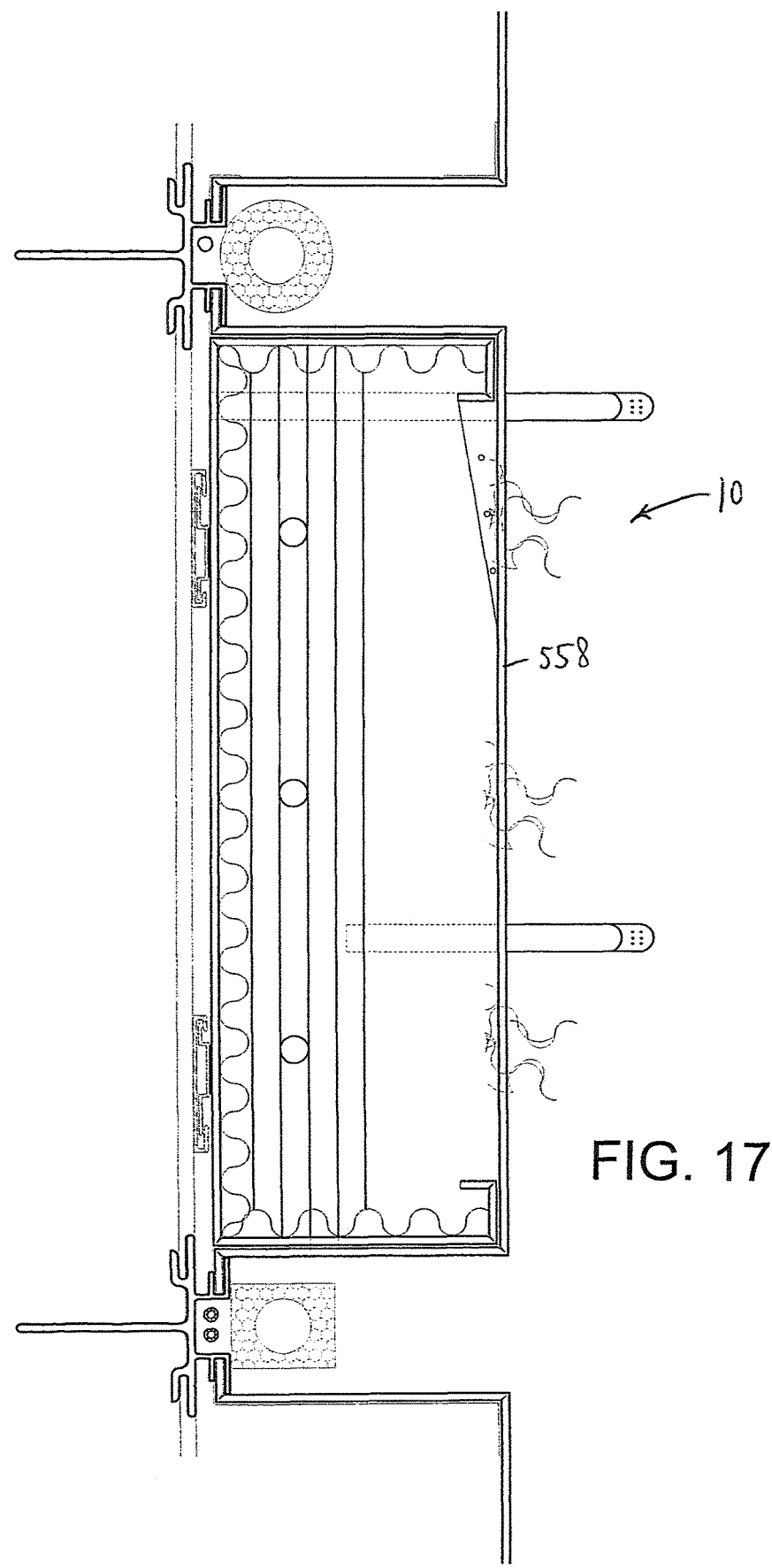
FIG. 17 is a cross-sectional view of a modified ecologically green unit with a vertically oriented flat front wall.

It will be appreciated that various changes can be made to the present invention within the scope of the claims herein. For example, although the present invention has been described with respect to each ecologically green unit 10 having trapezoidal shape side walls 18 and 20, any other shape of ecologically green unit 10 can be provided. For example, ecologically green unit 10 can have a vertically oriented front wall 558 as shown in FIG. 17, a bowed or convex front wall 658 as shown in FIG. 18, a bell shaped front wall 758 as shown in FIG. 19, or the like.

It will be appreciated that modifications can be provided to connect base frame 14 and cover frame 16 to wall 12.

Figure 20:
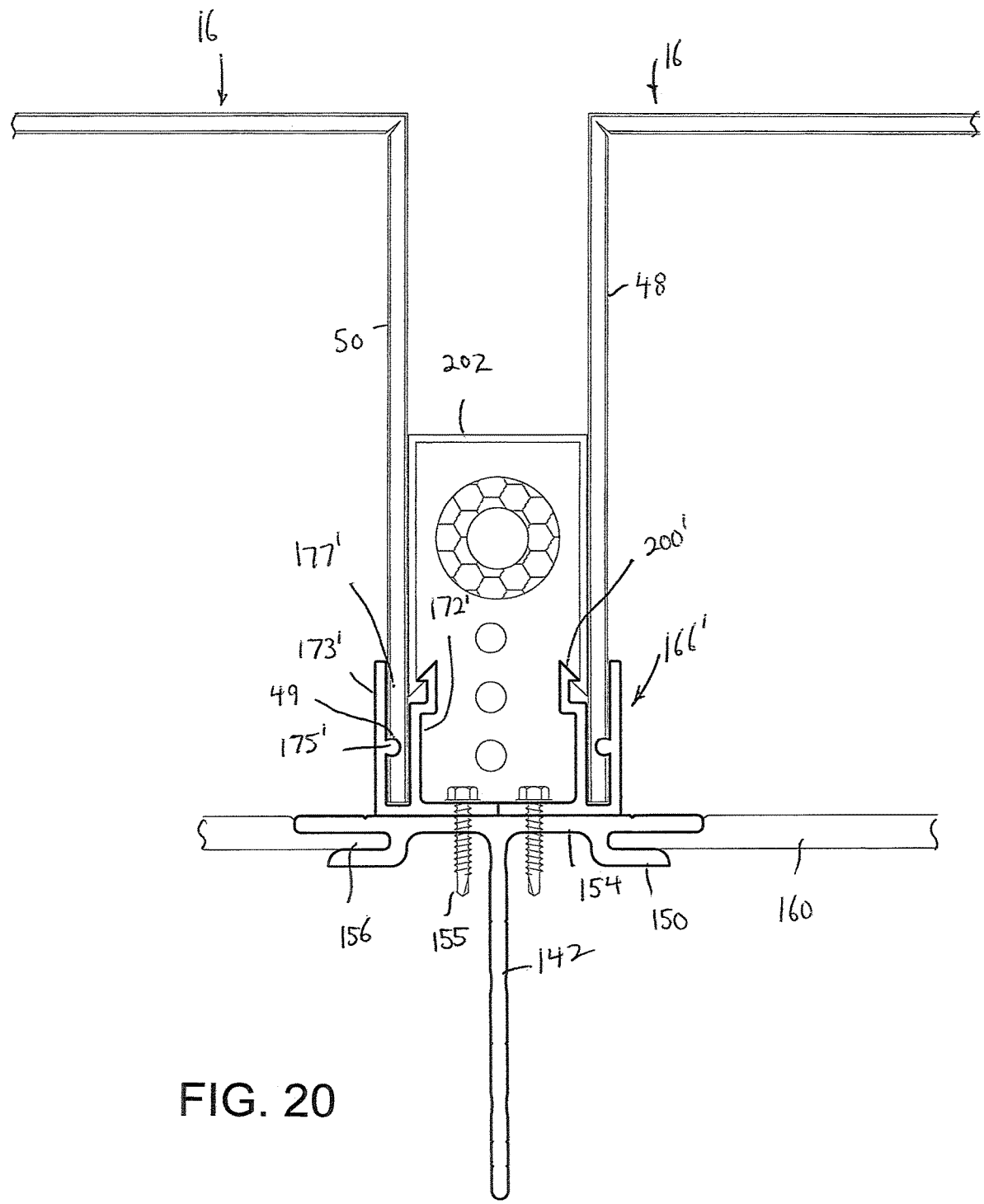
FIG. 20 is a plan view of a modified adjustment support member, assembled with the cover frame of two adjacent ecologically green units.

For example, as shown in FIG. 20, rear flanges 52 of cover frame 16 are eliminated. Instead, side walls 48 and 50 are directly assembled with a modified support member 166'. Modified support member 166' eliminates retaining walls 178 and 179. Instead, outwardly facing V-shaped catches 200' are provided at the free ends of upstanding walls 172' for securing cover 202 thereto, with upstanding walls 172' being spaced inwardly slightly from the ends of elongated rectangular lower plate 170'. More importantly, second upstanding walls 173' extend upwardly from the outer edges of elongated rectangular lower plate 170' in parallel, spaced apart relation from the first upstanding walls 172' to provide a gap 177' therebetween. The inner surfaces of second upstanding walls 173' each have an inwardly directed projection 175', and the facing surfaces of side walls 48 and 50 of cover frame 16 include complementary guide channels 49 for receiving respective projections 175'. Further, in such situation, at least one corner at the rear end of each side wall 48, 50 and respective top wall 52 and bottom wall 56, are cut-away, as shown in dashed lines by cut-away portions 51 in FIG. 2.

In order to assemble the structure, elongated rectangular plate 142 is assembled with retaining wall 130 and 132. Connecting panels 160 are secured within gaps 156 and a base frame 14 is secured thereto. Then, side walls 48 and 50 of cover frames 16 are slid into gaps 177'. This occurs because of cut-away portions 51 which permit such sliding movement. When assembled, projections 175' extend into guide channels 49 in order to secure cover frame 16 to modified support member 166'. Thereafter, modified support member 166' is secured to platform 154 by screws 155. Then, cover 202 is assembled with modified support member 166'.

Figure 21:
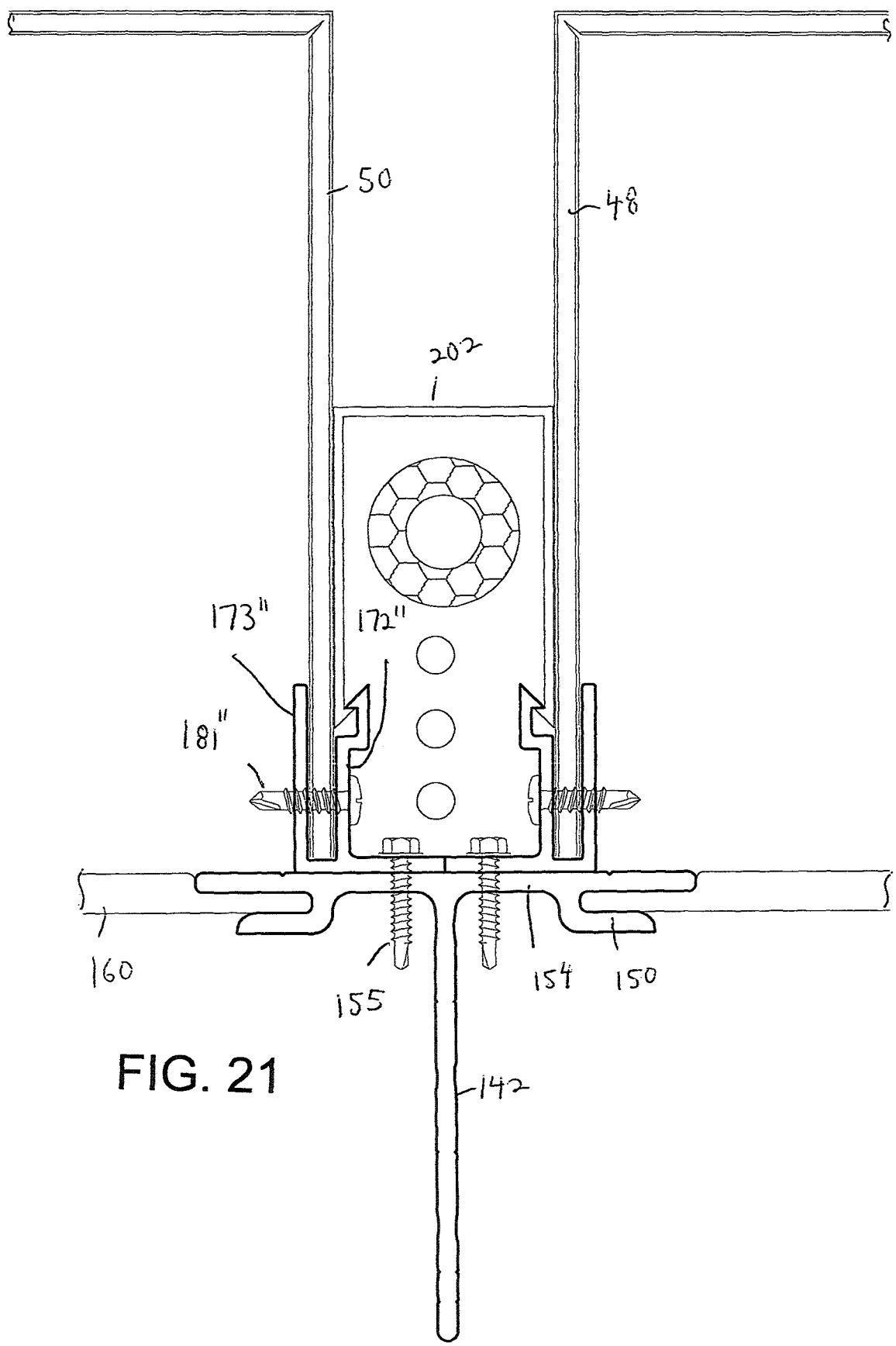
FIG. 21 is a plan view of a further modified adjustment support member, assembled with the cover frame of two adjacent ecologically green units.

Alternatively, as shown in FIG. 21, projections 175' and guide channels 49 can be eliminated. In such case, side walls 48 and 50 are held within gaps 177" by screws 181" extending through side walls 48, 50 and upstanding walls 172" and 173".

Figure 22:
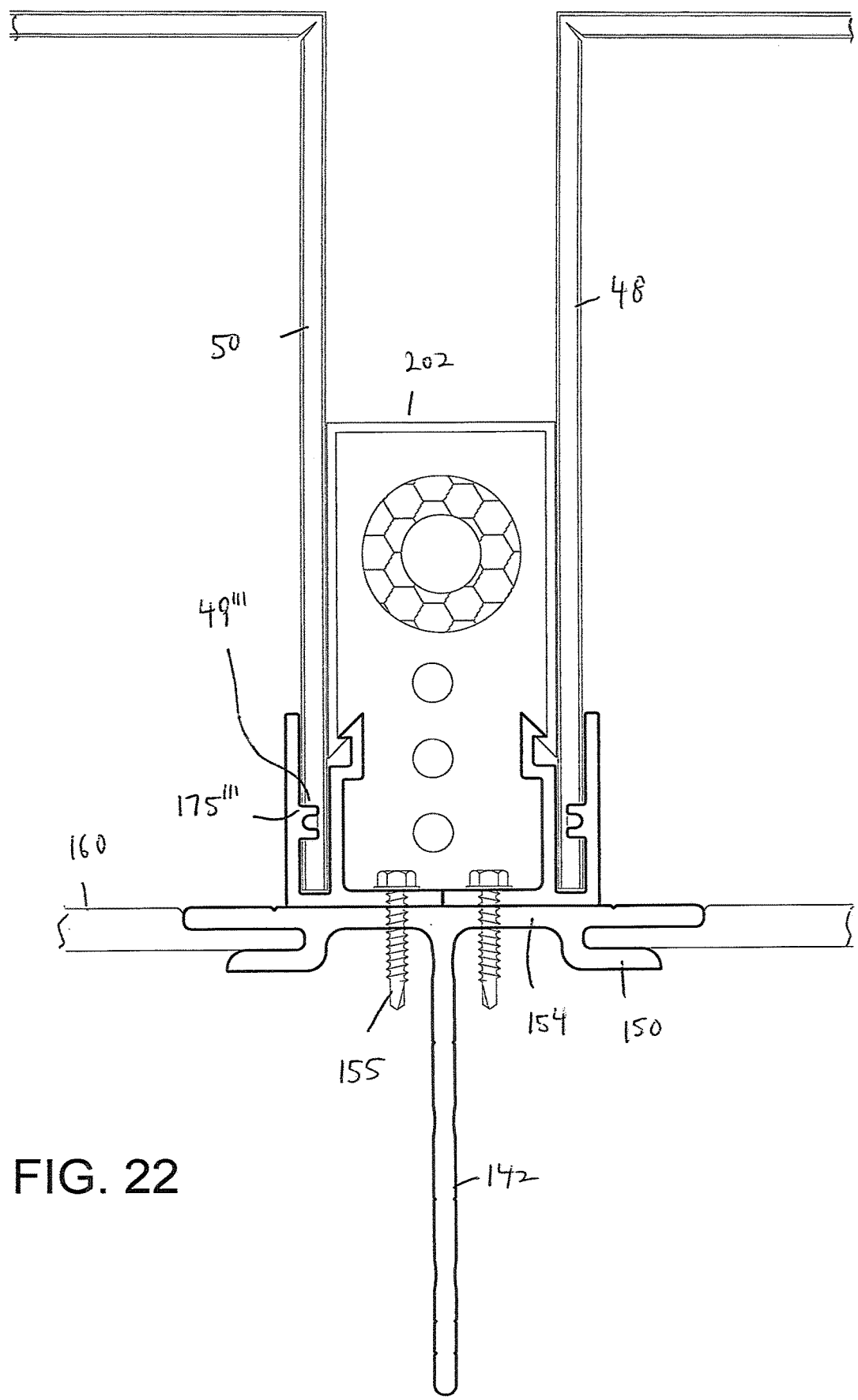
FIG. 22 is a plan view of a still further modified adjustment support member, assembled with the cover frame of two adjacent ecologically green units.

As a further modification, shown in FIG. 22, U-shaped projections 175''' replace projections 175' and complementary shaped guide channels 49''' replace guide channels 49. Otherwise the remaining structure is the same as that of FIG. 20.

Figure 23:
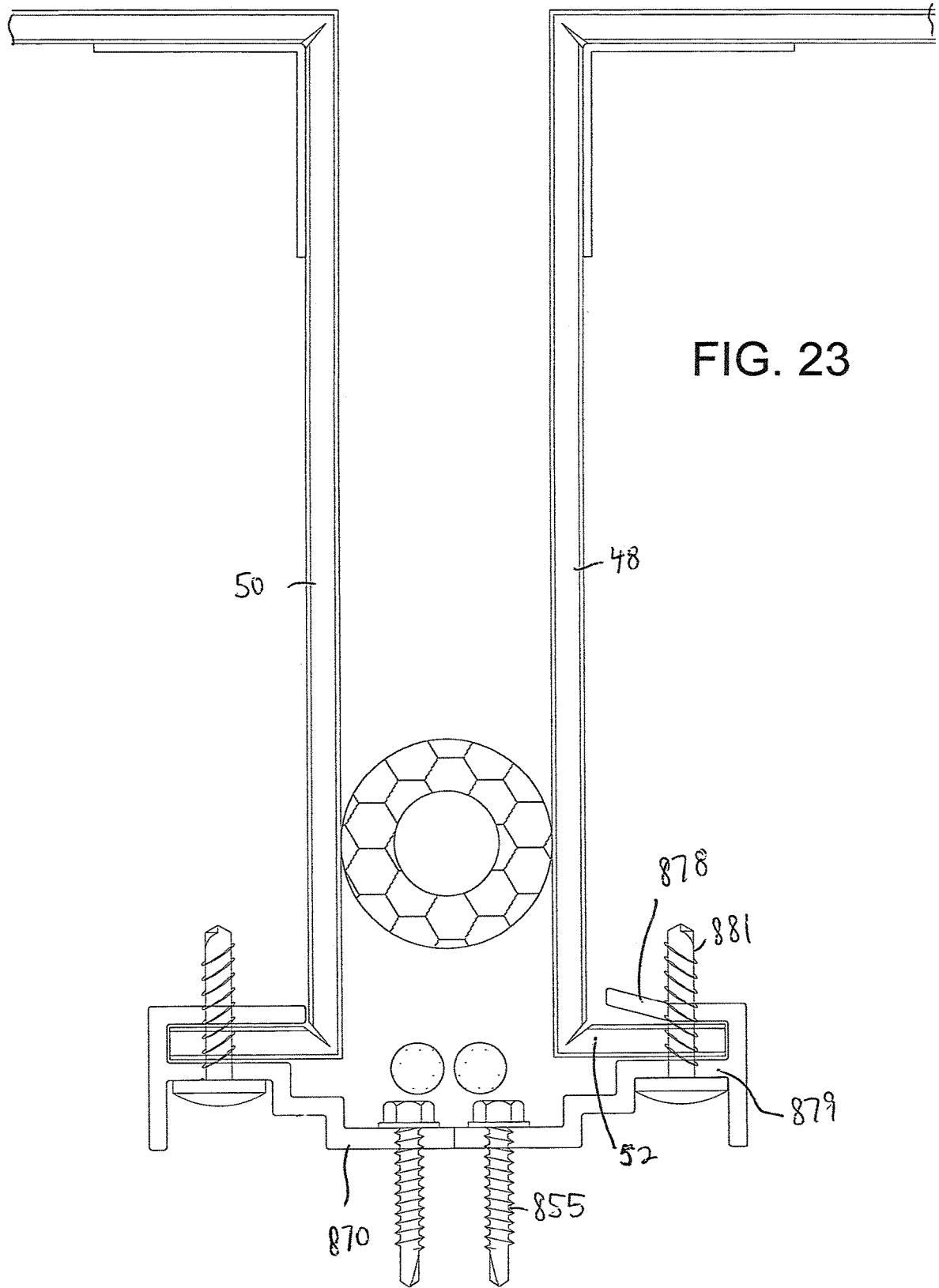
FIG. 23 is a plan view of a yet further modified adjustment support member, assembled with the cover frame of two adjacent ecologically green units.

It will be appreciated that base support 112, sliding support member 124, platform 154 and elongated rectangular plate 142 can be eliminated. In such case, as shown in FIG. 23, an elongated rectangular lower plate 870 corresponding to plate 170, can be secured by screws 855 directly to existing wall 12. With this arrangement, retaining walls 878 and 879 are provided, but extend in the opposite direction from retaining walls 178 and 179, that is, extend inwardly toward each other. In such case, rear flanges 52 of cover frame 16 turn inwardly, rather than outwardly, and are captured between retaining walls 878 and 879, and secured therein by screws 881. In such case, structural support assemblies 224 would also be secured directly to existing wall 12, with base frames 14 secured thereto.

Alternatively, instead of using structural support assemblies 224 to secure base frames 14 to existing wall 12, one or more brackets can be secured on the exposed surface of each existing wall 12 or connecting panel 160, with a base frame 14 secured to the brackets in a hanging manner, similar to a picture frame.

Figure 24:
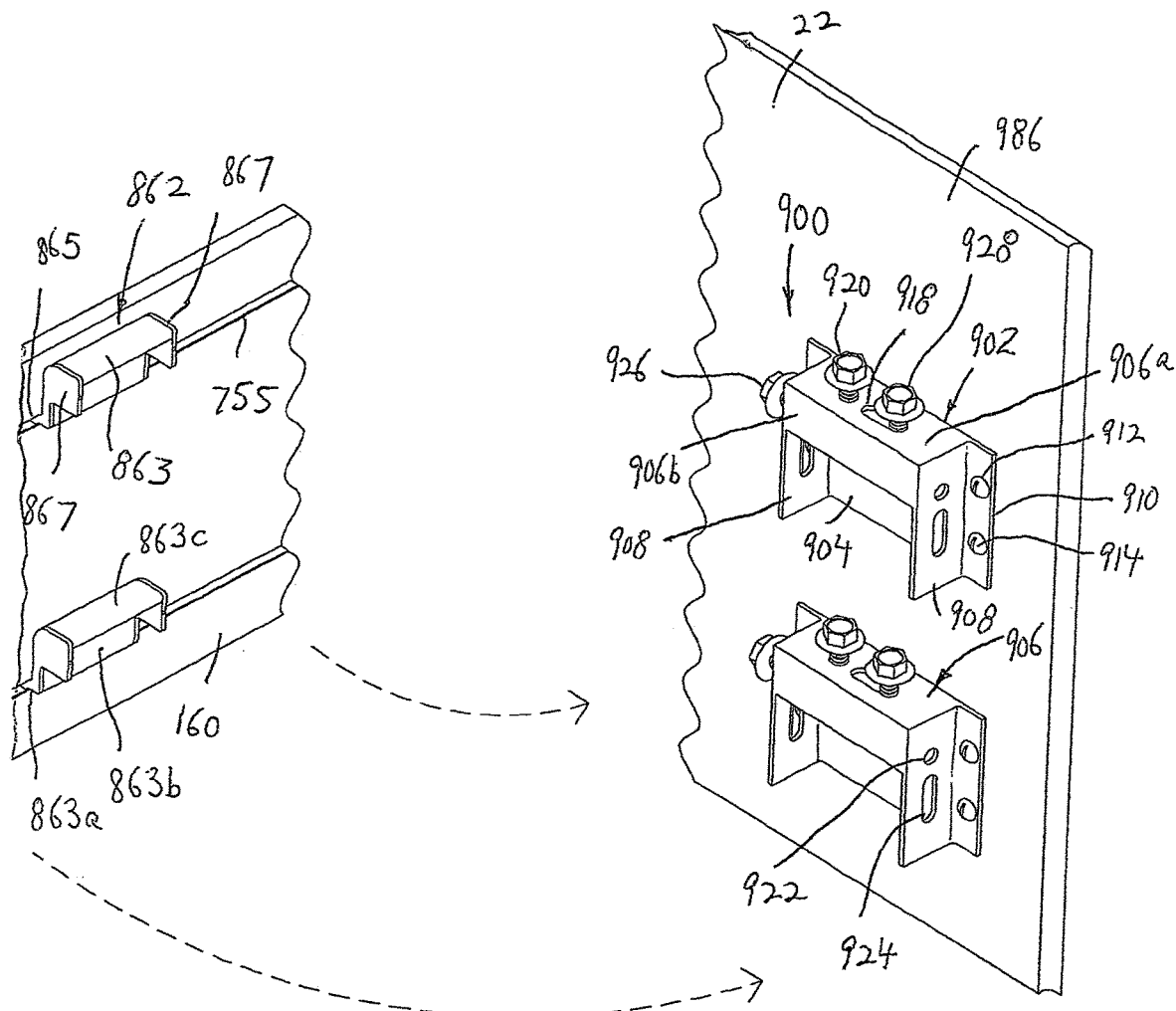
FIG. 24 is a perspective view of a bracket assembly for mounting a base frame to an existing wall.

In this regard, a preferred embodiment is shown in FIG. 24 in which Z-shaped brackets 862 each have a Z-shaped wall 863 having one end 865 formed in a bulbous or dovetail shape for slidable insertion in a correspondingly shaped slot 755 of a connecting panel 60. Specifically, each Z-shaped wall 863 includes a first wall 863a having the bulbous end 865 and extending orthogonally out from the outer surface of the respective connecting panel 160, a second wall 863b extending orthogonally up from the free end of first wall 863a, and a third top wall 863c extending orthogonally out from the free end of second wall 863b. Z-shaped brackets 862 further include side walls 867 on opposite sides thereof.

Complementary hook assemblies 900 are secured to the rear surface of rear wall 22 of base frame 14 for connection with Z-shaped brackets 862. Specifically, each hook assembly 900 includes an inverted J-shaped wall 902 formed by a first rectangular wall 904 which seats flush against the rear surface of rear wall 22 of base frame 14, and an inverted L-shaped wall 906 which extends out from the upper edge of first rectangular wall 904. L-shaped wall 906 includes a first top wall 906a which extends orthogonally out from the top edge of rectangular wall 904 and a downwardly extending wall 906b which extends down from the free edge of top wall 906a in parallel spaced apart relation from first wall 904. Rectangular side walls 908 are connected to and close off both sides of J-shaped wall 902. The width of rectangular wall 904 is greater than the width of J-shaped wall 902, such that rectangular wall extensions 910 extend to the sides of side walls 908, while also seating flush against the rear surface of wall panel 986. Openings 912 are provided in wall extensions 910 in order to receive screws 914 therein to secure each hook assembly 900 to the rear surface of wall panel 986.

With this arrangement, hook assemblies 900 are positioned over Z-shaped brackets 862 for mounting wall panels 986 to connecting panel 160 (or existing wall 12). In such case, top wall 906a seats on top wall 863c, and side walls 908 encompass and surround side walls 867. Further, downwardly extending wall 906b is positioned behind second wall 863b to prevent pullout of wall panels 986.

In order to provide vertical adjustment of wall panels 986 relative to connecting panels 160, upper wall 906a includes a first circular threaded opening 916 and an adjacent slot 918. An adjustment bolt 920 is threaded within the threaded opening 916 and engages the upper surface of top wall 863c for moving each hook assembly 900 up and down relative to the respective connecting panel 160.

In order to provide side to side adjustment of wall panels 986 relative to connecting panels 160, at least one side wall 908 includes a first circular threaded opening 922 and an adjacent slot 924. An adjustment bolt 926 is threaded within the threaded opening 922 and engages the adjacent side wall 867 for moving each hook assembly 900 side to side relative to the respective connecting panel 160.

In this regard, it will be appreciated that hook assemblies 900 are positioned near the edges of rear wall 22 in order to permit access to adjustment screws 920 and 926.

After adjustment bolts 920 and 926 have been rotated to provide adjustment of hook assemblies 900 relative to Z-shaped brackets 862, and thereby adjustment of wall panel 986 relative to the corresponding connecting panel 160, securing screws 928 which extend through slots 918 and 924 into threaded engagement with top wall 863c and side wall 867, respectively, are rotated to fix hook assemblies 900 relative to Z-shaped brackets 862.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An ecologically green unit to be mounted on an existing wall,
  comprising: a base frame;
  a securing arrangement for securing the base frame as a façade to a front face of an existing wall of a building;
  a plant root securing arrangement for securing roots of plants in the base frame;
  a plant guide for orienting and maintaining the plants in a desired horizontal orientation;
  a water supplying arrangement for supplying water to the plants in the base frame; wherein the water supplying arrangement includes at least one capillary member for wicking water to different areas within said base frame; and wherein the at least one capillary member includes a plurality of capillary tubes arranged in a mesh arrangement in a plurality of layers, with the capillary tubes in each layer being in spaced apart relation and the capillary tubes in different layers extending in different directions so as to create spaces between the capillary tubes for receiving soil for plant growth.

2. An ecologically green unit according to claim 1, wherein the plant root securing arrangement includes a mat positioned within said base frame.

3. An ecologically green unit according to claim 1, wherein said plant guide includes a mesh arrangement at a front portion of said base frame through which the plants extend.

4. An ecologically green unit according to claim 3, wherein said mesh arrangement is comprised of a plurality of wires, each separately and individually extended along a front portion of base frame in different directions.

5. An ecologically green unit according to claim 1, wherein:
the base frame includes a water reservoir area at a lower end thereof; and
the at least one capillary member includes a capillary mat for wicking water from the water reservoir area to an upper end of the base frame.

6. An ecologically green unit according to claim 5, wherein the base frame includes at least one wall defining the water reservoir area, and at least one opening in the at least one wall for draining water from the water reservoir area when the water in the water reservoir area reaches a predetermined level, with the capillary mat being in contact with water in the water reservoir.

7. An ecologically green unit according to claim 1, wherein each capillary tube is at least partially surrounded and is supported by a protective sheath.

8. An ecologically green unit according to claim 1, wherein the base frame includes a water reservoir area at a lower end thereof, and further comprising a porous sheet below the capillary tubes to prevent soil from entering the water reservoir area, while permitting water and air to pass through the porous sheet.

9. An ecologically green unit according to claim 1, further including an undulating barrier wall in the base frame, the barrier wall having openings for permitting passage of air and water therethrough, while preventing passage of soil therethrough.

10. An ecologically green unit according to claim 1, wherein the water supplying arrangement includes at least one opening in the base frame for receiving water therein.

11. An ecologically green unit according to claim 10, wherein the water supplying arrangement includes a rain water collecting arrangement for collecting rain water and supplying the rain water through the at least one opening in the base frame.

12. An ecologically green unit according to claim 11, wherein the water supplying arrangement includes:
a wall positioned above the ecologically green, unit, the wall including an opening for supplying water to the ecologically green unit by gravity,
a ramp at an upper portion of the existing wall for collecting and directing a flow of rain water to the opening in the wall, and a flow director associated with the opening in the wall for directing the rain water from the opening to the ecologically green unit.

13. An ecologically green unit according to claim 12, wherein the flow director includes a flap hinged to the wall immediately above the opening therein and in covering relation to the opening.

14. An ecologically green unit according to claim 12, wherein the water supplying arrangement further includes a valve associated with the ramp for controlling water flow to the opening in the wall.

15. An ecologically green unit according to claim 12, further including coping positioned above the wall and inclined downwardly toward the wall, the coping including at least one opening so that any rain water that falls on the coping drains through the at least one opening therein onto said ramp.

16. An ecologically green unit according to claim 1, further comprising an arrangement for directing sunlight to an interior of the base frame.

17. An ecologically green unit according to claim 16, wherein the sunlight directing arrangement includes at least one tube mounted in the base frame and extending out through a front of the base frame each tube including a transparent front end through which sunlight is adapted to enter and a transparent rear end through which the sunlight is emitted to the plants in the base frame.

18. An ecologically green unit according to claim 17, wherein each tube is hollow and has at least one opening in a front end thereof by which rain water is received and transported to an interior of the base frame.

19. An ecologically green unit according to claim 18, wherein each tube further includes a channel at a lower portion thereof to deliver vitamins and nutrients to the plants.

20. An ecologically green unit according to claim 1, wherein the water supplying arrangement further includes at least one water supplying tube for supplying water to an interior of the base frame.

21. An ecologically green unit according to claim 20, further comprising a control for controlling at least one of flow amount and flow times of water through the at least one water supplying tube.

22. An ecologically green unit according to claim 20, further including a lower drain area below the ecologically green unit for collecting water drained from the ecologically green unit and for providing the water in the lower drain area for use by the water supplying tube.

23. An ecologically green unit according to claim 1, further comprising a lighting arrangement associated with the ecologically green unit for illuminating the plants therein.

24. An ecologically green unit according to claim 1, wherein the base frame has a front wall that slopes outwardly and downwardly away from the existing wall.

25. An ecologically green unit according to claim 1, further comprising a cover frame in partial covering relation to the base frame, the cover frame having a front wall that slopes outwardly and downwardly away from the existing wall.

26. An ecologically green unit according to claim 1, wherein the securing arrangement includes:
at least one bracket member mounted to one of:
the existing wall and
a connecting panel connected to the existing wall; and
at least one hook member mounted to each base frame, with each hook member adapted to engage one bracket member for mounting the base frame to the one of the existing wall and the connecting panel.

27. An ecologically green unit according to claim 26, further including an adjustment arrangement for adjusting a position of each hook member relative to a respective said bracket member on which the hook member is mounted.

28. An ecologically green unit according to claim 1, wherein the securing arrangement, includes:
a first securing member adapted to be secured to the existing wall;
a second securing member adapted to be secured to the base frame; and the second securing member removably connected with the first securing member.

29. An ecologically green unit according to claim 28, wherein the base frame is connected directly or indirectly to the first securing member, and further including a cover frame in at least partial covering relation to the base frame, the cover frame being connected to the second securing member.

30. An ecologically green unit according to claim 29, wherein the second securing member includes parallel, spaced apart walls, and the cover frame is retained between said parallel, spaced apart walls.

31. An ecologically green unit according to claim 30, wherein the cover frame is retained between said parallel, spaced apart walls by at least one of the following:
   screws,
   projections in at least one of the parallel, spaced apart walls and complementary guide channels in the cover frame.

32. A wall covering arrangement including a plurality of ecologically green units according to claim 1, mounted on the existing wall.

\* \* \* \* \*